(12) United States Patent
Hwang et al.

(10) Patent No.: US 9,443,511 B2
(45) Date of Patent: Sep. 13, 2016

(54) SYSTEM AND METHOD FOR RECOGNIZING ENVIRONMENTAL SOUND

(75) Inventors: Kyu Woong Hwang, Taejon (KR); Taesu Kim, Seoul (KR); Kisun You, Suwon (KR)

(73) Assignee: QUALCOMM Incorporated, San Diego, CA (US)

( * ) Notice: Subject to any disclaimer, the term of this patent is extended or adjusted under 35 U.S.C. 154(b) by 1140 days.

(21) Appl. No.: 13/285,971

(22) Filed: Oct. 31, 2011

(65) Prior Publication Data

US 2012/0224706 A1 Sep. 6, 2012

Related U.S. Application Data

(60) Provisional application No. 61/449,475, filed on Mar. 4, 2011.

(51) Int. Cl.
| | |
|---|---|
| *G06F 17/00* | (2006.01) |
| *H04R 29/00* | (2006.01) |
| *G10L 15/10* | (2006.01) |

(Continued)

(52) U.S. Cl.
CPC ............. *G10L 15/10* (2013.01); *G10L 15/20* (2013.01); *G10L 25/00* (2013.01)

(58) Field of Classification Search
CPC ...... H04R 29/00; H03G 3/24; H03G 3/3005; G10L 15/00; G10L 15/20; G10L 25/00
USPC .................... 700/94; 381/56, 57, 71.9, 71.12
See application file for complete search history.

(56) References Cited

U.S. PATENT DOCUMENTS

| | | | |
|---|---|---|---|
| 5,970,446 A | 10/1999 | Goldberg et al. | |
| 2002/0059068 A1* | 5/2002 | Rose | G10L 15/08 704/246 |
| 2002/0087306 A1 | 7/2002 | Lee et al. | |

(Continued)

FOREIGN PATENT DOCUMENTS

| | | |
|---|---|---|
| CN | 1448915 A | 10/2003 |
| CN | 101114449 A | 1/2008 |

(Continued)

OTHER PUBLICATIONS

Hong Lu et al., "SoundSense: Scalable Sound Sensing for People-Centric Applications on Mobile Phones", MobiSys'09, Jun. 22-25, 2009, Kraków, Poland, pp. 165-178.

(Continued)

*Primary Examiner* — Vivian Chin
*Assistant Examiner* — Douglas Suthers
(74) *Attorney, Agent, or Firm* — Toler Law Group, PC

(57) ABSTRACT

A method for recognizing an environmental sound in a client device in cooperation with a server is disclosed. The client device includes a client database having a plurality of sound models of environmental sounds and a plurality of labels, each of which identifies at least one sound model. The client device receives an input environmental sound and generates an input sound model based on the input environmental sound. At the client device, a similarity value is determined between the input sound model and each of the sound models to identify one or more sound models from the client database that are similar to the input sound model. A label is selected from labels associated with the identified sound models, and the selected label is associated with the input environmental sound based on a confidence level of the selected label.

117 Claims, 14 Drawing Sheets

| SOUND MODEL | LABEL | LOCATION | TIME | ANTI-MODEL | PRIOR OCCURRENCE |
|---|---|---|---|---|---|
| HISTOGRAM A | STREET – TRAFFIC | SEOUL | DAY | HISTOGRAM –A | 30 |
| HISTOGRAM B | STREET – TRAFFIC | SEOUL | NIGHT | HISTOGRAM –B | 20 |
| HISTOGRAM C | STREET – TRAFFIC | SAN DIEGO | DAY | HISTOGRAM –C | 5 |
| HISTOGRAM D | STREET – TRAFFIC | CITY | NIGHT | HISTOGRAM –D | 20 |
| HISTOGRAM E | OFFICE – SPEECH | SEOUL | DAY | HISTOGRAM –E | 10 |

(51) Int. Cl.
*G10L 15/20* (2006.01)
*G10L 25/00* (2013.01)

(56) References Cited

U.S. PATENT DOCUMENTS

| | | | |
|---|---|---|---|
| 2003/0061037 A1* | 3/2003 | Droppo | G10L 15/20 704/226 |
| 2005/0147256 A1 | 7/2005 | Peters et al. | |
| 2008/0086311 A1 | 4/2008 | Conwell et al. | |
| 2010/0211693 A1 | 8/2010 | Master et al. | |

FOREIGN PATENT DOCUMENTS

| | | |
|---|---|---|
| JP | 2005148342 A | 6/2005 |
| JP | 2010266721 A | 11/2010 |
| WO | 2007088299 | 8/2007 |
| WO | 2008126347 A1 | 10/2008 |
| WO | WO2010070314 A1 | 6/2010 |

OTHER PUBLICATIONS

Bouwman, G., et al., "Utterance Verification Based on the Likelihood Distance to Alternative Paths", Lecture Notes in Computer Science/Computational Science ICCS 2009, vol. 2448, Sep. 9, 2002, pp. 212-220.

Partial International Search Report for International Application No. PCT/US2012/022383, mailed Apr. 16, 2012.

International Search Report and Written Opinion—PCT/US2012/022383—ISA/EPO—Jun. 13, 2012.

International Preliminary Report on Patentablility for PCT/US2012/022383 mailed Jul. 1, 2013, 43 pp.

* cited by examiner

Sound models

| SOUND MODEL | LABEL | LOCATION | TIME | ANTI-MODEL | PRIOR OCCURRENCE |
|---|---|---|---|---|---|
| HISTOGRAM A | STREET – TRAFFIC | SEOUL | DAY | HISTOGRAM ~A | 30 |
| HISTOGRAM B | STREET – TRAFFIC | SEOUL | NIGHT | HISTOGRAM ~B | 20 |
| HISTOGRAM C | STREET – TRAFFIC | SAN DIEGO | DAY | HISTOGRAM ~C | 5 |
| HISTOGRAM D | STREET – TRAFFIC | CITY | NIGHT | HISTOGRAM ~D | 20 |
| HISTOGRAM E | OFFICE – SPEECH | SEOUL | DAY | HISTOGRAM ~E | 10 |

FIG. 8

SYSTEM AND METHOD FOR RECOGNIZING ENVIRONMENTAL SOUND

CLAIM OF PRIORITY UNDER 35 U.S.C. §119

This application is based upon and claims the benefit of priority from U.S. Provisional Patent Application No. 61/449,475, filed on Mar. 4, 2011, the entire contents of which are incorporated herein by reference.

TECHNICAL FIELD

The present disclosure relates generally to sound recognition. More specifically, the present disclosure relates to a system and method for recognizing an environmental sound of a client device in communication with a server.

BACKGROUND

Sound-based environment recognition technology has been used in modern mobile communication systems for providing user services. For example, a device such as a mobile device may be configured to detect ambient sound, and recognize the sound environment surrounding the device. The recognized sound environment may be used to provide the user of the device with targeted information such as advertisement information and social networking information.

In daily lives, mobile device users may be subject to a large number of different sound environments. In many cases, the devices may not be capable of storing or handling the sound environmental data due to limited storage capacity or processing power. Further, if a device is used to recognize only ambient sounds of its surroundings, the device may not be able to accurately recognize ambient sounds of new surroundings. For example, if a mobile device is used to capture and recognize the ambient sounds at a new place, such as vacation resort, the device may not accurately recognize sound environment of the surroundings.

In addition, users may carry their mobile devices to similar sound environments such as classrooms, meeting rooms, assembly halls, etc. In such instances, the mobile devices may not be able to distinguish and accurately recognize different sound environments.

Thus, there is a need for a method and an apparatus that enable a mobile device to recognize a broader scope of environmental sounds than may be available to the device while increasing the accuracy of environmental sound recognition.

SUMMARY

The present disclosure provides systems and methods for recognizing an environmental sound of a device in communication with a server.

According to one aspect of the present disclosure, a method for recognizing an environmental sound in a client device is disclosed. The method includes providing a client database including a plurality of sound models of environmental sounds and a plurality of labels, each of which identifies at least one sound model. An input environmental sound is received, and input sound model is generated based on the input environmental sound. A similarity values between input sound model and each of the sound models is determined to identify one or more sound models from the client database that are similar to the input sound model. Further, a label is selected from labels associated with the identified sound models. The selected label is associated with the input environmental sound based on a confidence level of the selected label. This disclosure also describes a device, an apparatus, a combination of means, and a computer-readable medium relating to this method.

According to another aspect of the present disclosure, a method for recognizing an environmental sound received from a client device in a server is disclosed. The method includes providing a server database including a plurality of sound models of environmental sounds and a plurality of labels, each of which identifies at least one sound model. The method further includes receiving an input sound model representing an input environmental sound from the client device. A similarity value between the input sound model and each of the sound models is determined to identify one or more sound models from the server database that are similar to the input sound model. Then, a label is selected from labels associated with the identified sound models. The selected label is associated with the input environmental sound based on a confidence level of the selected level. This disclosure also describes a server, a computer system, a combination of means, and a computer-readable medium relating to this method.

BRIEF DESCRIPTION OF THE DRAWINGS

FIG. 8 shows an exemplary client or server database of sound models and information associated with the sound models, according to one embodiment of the present disclosure.

DETAILED DESCRIPTION

Figure 1:
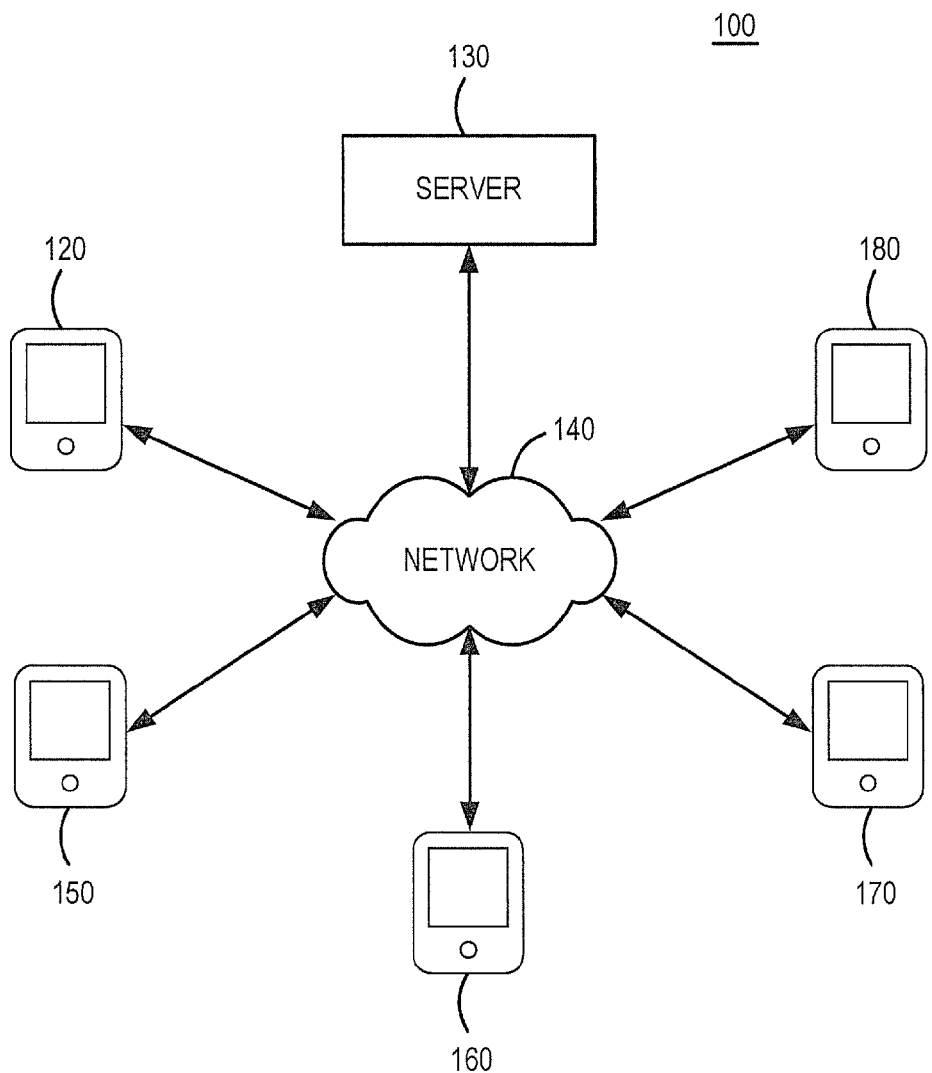
FIG. 1 illustrates an exemplary system including a plurality of client devices and a server which communicate via a network.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 illustrates an exemplary system 100 including a plurality of client devices 120, 150, 160, 170, and 180 and a server 130, which communicate via a network 140. Each of the client devices 120, 150, 160, 170, and 180 is configured to store a database of sound models for recognizing environmental sounds. The server 130 stores a database of sound models that may be provided to any one of the client devices 120, 150, 160, 170, and 180. Each of the client devices 120, 150, 160, 170, and 180 is configured to capture environmental sound of the surroundings (i.e., input environmental sound) through a sound sensor (e.g., microphone) and recognize the environmental sound to generate a label for the captured environmental sound based on the stored database. If any client device is not able to recognize its captured sound, the device sends a request to the server 130 to recognize the sound. The server 130 is configured to receive environmental sounds from one or more client devices and recognize the environmental sounds by generating associated labels. The labels are then transmitted to the requesting client devices.

The present disclosure may be practiced in a crowd-sourcing framework that aggregates sound models from any of the client devices 120, 150, 160, 170, and 180, and shares the aggregated sound models among the client devices 120, 150, 160, 170, and 180. The crowd-sourcing framework improves the sound recognition accuracy of the client devices 120, 150, 160, 170, and 180 by sharing the sound models with the server 130.

The client devices 120, 150, 160, 170, and 180 may be any suitable mobile device, such as a cellular phone, a laptop, a car accessory, or the like, equipped with a sound capturing capability, e.g., a microphone, and communication capability through a data and/or communication network. Alternatively, the client devices 120, 150, 160, 170, and 180 may be any device fixed at a particular location, such as a security camera, a desktop computer, etc.

Figure 2:
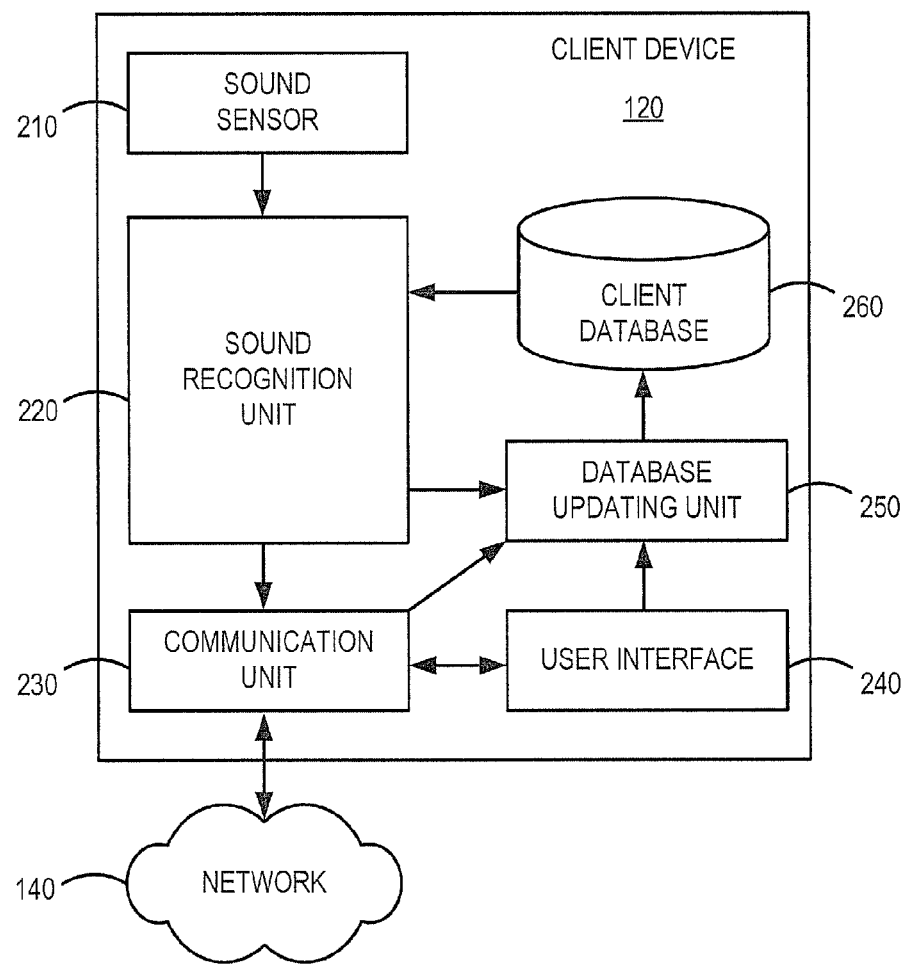
FIG. 2 depicts an exemplary configuration of a client device for recognizing an environmental sound according to one embodiment of the present disclosure.

FIG. 2 depicts an exemplary configuration of the client device 120 for recognizing an environmental sound according to one embodiment of the present disclosure. The client device 120 includes a sound sensor 210, a sound recognition unit 220, a communication unit 230, a user interface 240, a database updating unit 250, and a client database 260. Although the client device 120 is illustrated in FIG. 2, the other client devices 150, 160, 170, and 180 may implement a similar configuration. The above described units in the client device 120 may be implemented by hardware, software executed in one or more processors, and/or a combination thereof.

The sound sensor 210 is configured to capture an input environmental sound. The sound sensor 210 may include, e.g., one or more microphones or any other type of sound sensors used to measure, record, or otherwise convey any aspect of environmental sounds of the client device 120. Such sound sensor 210 may employ software and/or hardware adapted for sound capturing capability in the client device 120. The sound sensor 210 may also be a microphone provided in the client device 120 that is used for telephone calls or video recording.

In one embodiment, the client device 120 may be configured to perform a background process for detecting environmental sounds constantly via the sound sensor 210. Alternatively, the client device 120 may be configured to detect environmental sounds at a predetermined time, at predetermined intervals, or in response to a user's command.

Environmental sounds detected by a client device 120 may include any sounds of the surroundings of the client device 120. Such sounds may include, for example, engine noise, honking of a horn, subway noise, animal sounds, human voices, footsteps, knocking, tableware sounds, a whistle, etc.

The client database 260 stores sound models representing environmental sounds. A sound model is used for sound recognition as a statistical representation of an environmental sound that makes up each recognition target sound. The sound models may be generated based on training sound databases by using any techniques well known in the art including, but not limited to, Gaussian Mixture Model (GMM) or Hidden Markov Model (HMM). In some embodiments, the sound model may be represented as a Gaussian histogram, which will be described in detail below. A storage size and processing time for the sound model may be reduced using the Gaussian histogram. The client database 260 includes predetermined sound models and may also include associated information, such as anti-models, labels, thresholds, location, time, prior occurrence information, etc. Among such information, a label may be used to identify an input environmental sound. For example, an input environmental sound detected by a client device 120 can be associated with a label identifying one or more sound models, for example, by indicating the location and type of activity (or context) for the environmental sound such as a street and traffic information. The location of the environmental sound may indicate a street, an office, a subway station, a car, a restaurant, etc. Also, the activity information of the environmental sound may indicate music, speech, television, walking, traffic, etc. Thus, sound models associated with a location may be represented differently according to different activities occurring in the same location, and sound models associated with an activity may be represented differently according to different locations where the activity occurs.

The sound recognition unit 220 recognizes an input environmental sound captured by the sound sensor 210, by accessing the client database 260, to produce a label for the input environmental sound as a recognition result thereof. Specifically, the sound recognition unit 220 generates a sound model for the input environmental sound, and determines a similarity value between the input sound model and each of the predetermined sound models stored in the client database 260 to identify, from the client database 260, one or more sound models similar to the input sound model. Further, the sound recognition unit 220 selects a label associated with a largest number of sound models among the identified sound models and determines a confidence level of the selected label, as described in detail below with reference to FIGS. 4B to 4D. The sound recognition unit 220 then outputs the selected label based on the confidence level of the selected label. For example, if the confidence level is equal to or greater than a predetermined confidence threshold, the sound recognition unit 220 associates the selected label with the input environmental sound for output to a user as a recognition result.

The communication unit 230 is configured to send a request to the server 130 via the network 140 to recognize the input environmental sound if the confidence level is less than the predetermined confidence threshold. In such case, the communication unit 230 receives a label for the input environmental sound and/or one or more sound models corresponding to the input environmental sound from the server 130. The communication unit 230 may also receive, from the server 130, additional information such as a location, a time, an anti-model, a label, prior occurrence information, and/or a threshold associated with each of the one or more sound models received from the server 130.

The communication unit 230 may be further configured to transmit the input sound model to the server 130 for requesting the server 130 to recognize the input environmental sound. Further, the communication unit 230 may transmit an input location and input time associated with the input sound model. The input location indicates a particular location where the input environmental sound is detected, and the input time indicates a particular time when the input environmental sound is detected. The input location may be obtained using a location service such as Global Positioning System (GPS) through a network. Further, the input time may be obtained from a clock unit (not shown) in the client device 120 or a network service provider.

The user interface 240 is configured to allow the user to confirm if the label provided either from the sound recognition unit 220 or from the server 130 is correct. Through the user interface 240, the user may provide an input to confirm the accuracy of the label or provide a correct label if the provided label is incorrect.

The database updating unit 250 updates the client database 260 with the one or more sound models and the additional information, as described above, including the label received from the server 130. In some embodiments, the database updating unit 250 is further configured to update the client database 260 based on the user input provided through the user interface 240.

Figure 3:
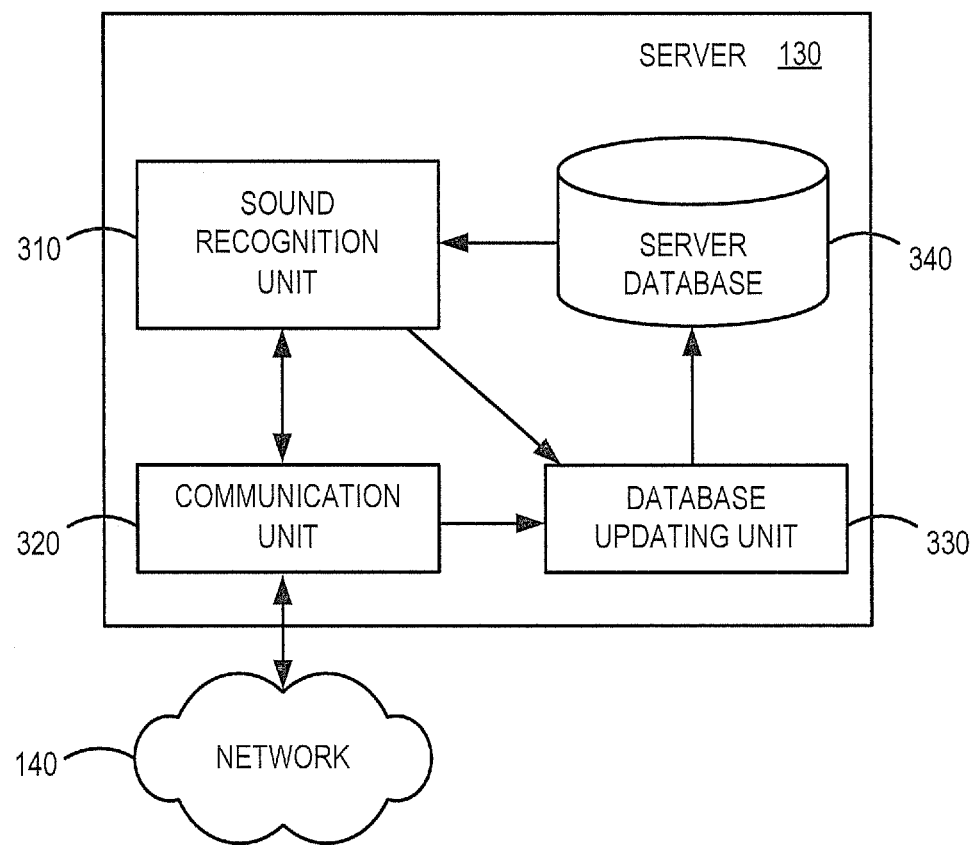
FIG. 3 depicts an exemplary configuration of a server for recognizing an environmental sound according to one embodiment of the present disclosure.

FIG. 3 depicts an exemplary configuration of the server 130 for recognizing an environmental sound according to one embodiment of the present disclosure. The server 130 includes a sound recognition unit 310, a communication unit 320, a database updating unit 330, and a server database 340.

The server database 340 stores sound models representing environmental sounds. In some embodiments, the sound models may be represented as Gaussian histograms. The server database 340 may include predetermined sound models and associated information, such as anti-models, labels, thresholds, locations, times, prior occurrence information, etc. Among such information, a label may be utilized for identifying an input environmental sound.

The communication unit 320 is configured to receive a request for recognition of an input environmental sound from the client device 120 via the network 140. Further, the communication unit 320 receives, from the client device 120, an input sound model which characterizes an input environmental sound. In some embodiments, the communication unit 320 receives an input sound model and associated information including a location, a time, and a label, etc.

The sound recognition unit 310 recognizes the input environmental sound by accessing the server database 340, to determine a label for the input environmental sound as a recognition result thereof. Specifically, the sound recognition unit 310 determines a similarity value between the input sound model and each of the predetermined sound models stored in the server database 340 to identify one or more sound models from the server database 340 that are similar to the input sound model. Further, the sound recognition unit 310 selects a label associated with a largest number of sound models among the identified sound models and determines a confidence level of the selected label, as described in detail below with reference to FIGS. 4B to 4D.

The communication unit 320 is further configured to provide the selected label and/or one or more sound models similar to the input sound model to the client device 120 via the network 140. Also, the communication unit 320 may provide additional information associated with each of the one or more sound models, such as an anti-model, a label, a threshold, a location, a time, prior occurrence information, to the client device 120. The above information including sound models may be used by the client device 120 for sound recognition.

As described above, the user interface 240 of the client device 120 may receive an input from the user to confirm if the selected label from the server 130 is correct. The client device 120 may send the user input to the server 130 via the network 140. The database updating unit 330 then updates the server database 340 based on the user input on the selected label.

In some embodiments, the sound recognition unit 310 identifies one or more sound models, stored in the server database 340, based on the associated locations and times that match the location and time of the input sound model. In the sound recognition unit 310, a sound model having a greatest similarity to the input sound model is identified among the one or more sound models. The database updating unit 330 updates the server database 340 by adding the input sound model or merging the input sound model and the sound model having the greatest similarity, which will be described in detail with reference to FIG. 10.

Figure 4A:
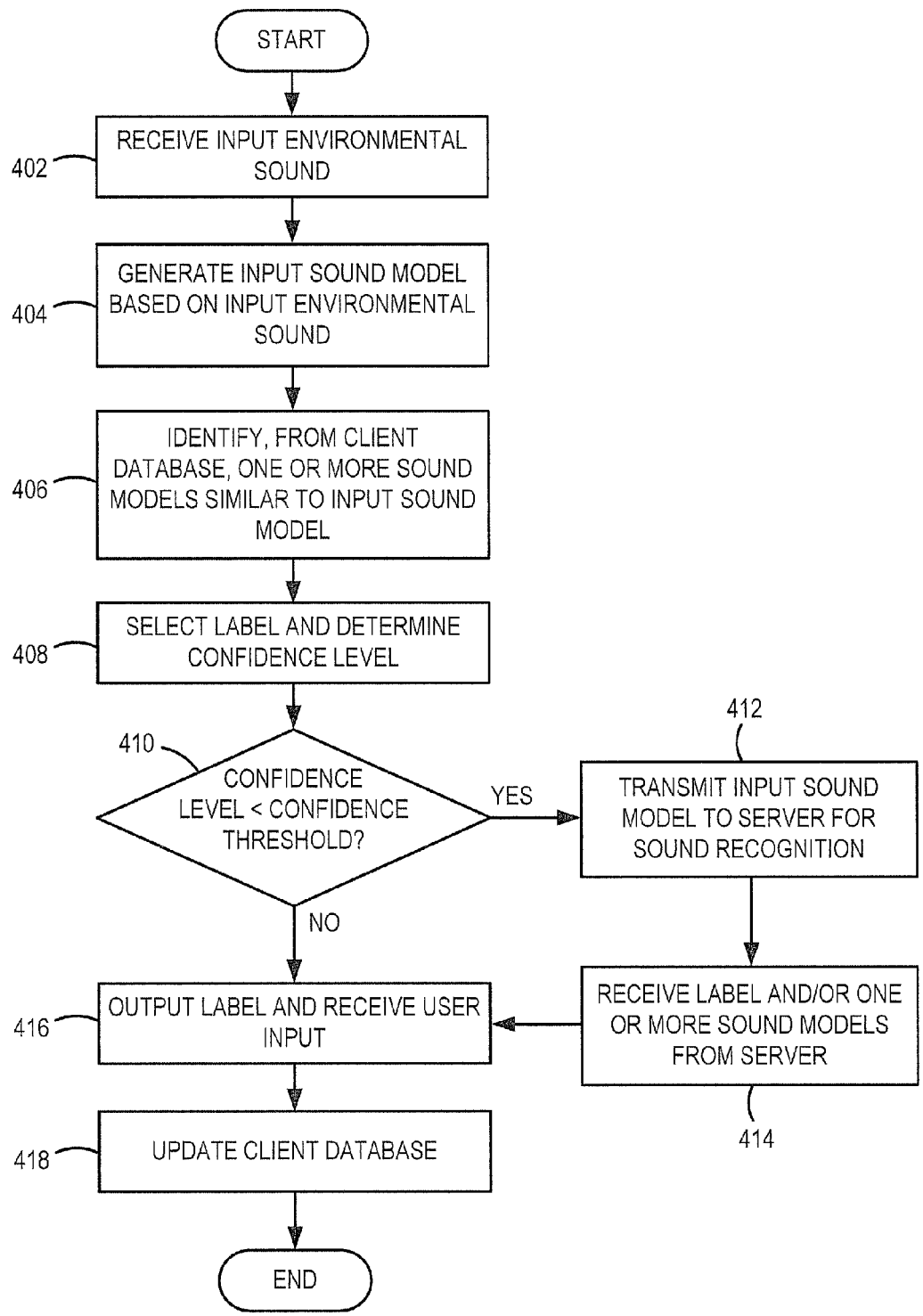
FIG. 4A illustrates a flowchart of a method, performed by a client device, for recognizing an environmental sound according to one embodiment of the present disclosure.

FIG. 4A illustrates a flowchart of a method, performed by a client device, for recognizing an environmental sound in accordance with one embodiment of the present disclosure. The sound sensor 210 of the client device 120 receives an input environmental sound by detecting and capturing an environmental sound of the surroundings, at 402. The sound recognition unit 220 of the client device 120 generates an input sound model based on the input environmental sound, at 404. The input sound model may be generated based on a sound feature extracted from the input environmental sound.

The sound feature may be extracted from the input environmental sound, using any suitable signal processing scheme, including speech compression, enhancement, recognition, and synthesis methods. For example, such signal processing scheme may employ MFCC (Mel-frequency cepstral coefficients), LPC (linear predictive coding), and/or LSP (line spectral pair) techniques, which are well-known methods for speech recognition or speech codec. For example, a sound feature may be extracted from an input environmental sound under the MFCC method as follows. A frame of an input environmental sound in the time domain (e.g., raw sound signal) is multiplied by a windowing function, e.g., hamming window. The sound signal is then Fourier transformed to the frequency domain, and a power is calculated for each band in the spectrum of the transformed signal in the frequency domain. A logarithm operation and a discrete cosine transform (DCT) operation are performed on each calculated power to obtain DCT coefficients. A mean value over a period of a predetermined time in the past is subtracted from each DCT coefficient for binarization and a set of the binarization results constitutes the sound feature.

Further, the sound recognition unit 220 of the client device 120 determines a similarity value between the input sound model and each of the sound models stored in the client database 260 to identify one or more sound models that are similar to the input sound model, at 406. For ease of reference, the one or more sound models identified as being similar to the input sound model are also referred to as similar sound models herein. A similarity value may be represented by a probability that one sound model corresponds to another sound model. For example, a similarity value can be determined by the distance between the input sound model and each of the sound models in the client database 260. In such case, one or more sound models having a distance less than a predetermined distance from the input sound model are identified as being similar to the input sound model. Additionally or alternatively, a predetermined number of sound models having the smallest distances from the input sound model may be identified as being similar to the input sound model.

In some embodiments, the sound models are represented by predetermined histograms (e.g. Gaussian histograms). In this case, the distance may be calculated by summing the differences in the histogram counts between a histogram representing the input sound model ("input histogram") and each of the predetermined histograms.

In some other embodiments, the distance between histograms may be calculated by using Kullback-Leibler (KL) divergence. KL divergence is defined as a weighted log ratio between two histograms with the more frequently occurring histogram having a larger weight. In some embodiments, the KL divergence, $D_{KL}$ between two histograms $H(A_m)$ and $H(A_n)$ representing sound clips $A_m$ and $A_n$, respectively, is given as follows:

$$D_{KL}(H(A_m) \| H(A_n)) = \sum_k h_k(A_m) \log \frac{h_k(A_m)}{h_k(A_n)} \quad \text{(Equation 1)}$$

where $h_k(A_m)$ and $h_k(A_n)$ represent histogram counts, and k is an index of Gaussian clusters that represent the entire set of sound features in the GMM.

It should be noted that Equation 1 above is not symmetric for $H(A_m)$ and $H(A_n)$, and thus, the distance calculation will be affected by which histograms are used as $H(A_m)$ or $H(A_n)$ between the input histogram and the predetermined histogram. For example, a first KL divergence may be calculated by setting $H(A_m)$ as the predetermined histogram and setting $H(A_n)$ as the input histogram. A second KL divergence may be calculated by setting $H(A_m)$ to the input histogram and setting $H(A_n)$ to the predetermined histogram. In some embodiments, both KL divergences may be calculated and the average of the two KL divergences may be used as the distance. It is noted that other schemes for calculating the similarity of two sound models may also be used without departing from the spirit and scope of the present disclosure.

At 408, the sound recognition unit 220 of the client device 120 then selects a label for the input environmental sound and determines a confidence level of the selected label. The specific operations for selecting the label and determining the confidence level are described below in detail with reference to FIGS. 4B to 4D.

The sound recognition unit 220 of the client device 120 compares the confidence level to a predetermined confidence threshold, which may be set to a fixed value for all predetermined sound models, at 410. Alternatively, different confidence thresholds may be assigned to different predetermined sound models. Further, the thresholds may be changed according to a user input. For example, if a user indicates that the selected label is incorrect, then the threshold corresponding to the recognized sound model may be adjusted to a higher value.

If the confidence level is determined to be equal to or greater than the predetermined confidence threshold ("NO" at 410), the sound recognition unit 220 outputs the selected label to a user, at 416. Otherwise, if the confidence level is less than the predetermined confidence threshold ("YES" at 410), the communication unit 230 of the client device 120 transmits the input sound model to the server 130 for requesting to recognize the input environmental sound, at 412. In response to the request, the server 130 recognizes the input environmental sound for the client device 120 to select a label for the input environmental sound and/or one or more sound models, as described in further detail below.

The communication unit 230 of the client device 120 receives the selected label and/or one or more sound models from the server 130, for updating the client database 260, at 414. Alternatively, if the server 130 fails to recognize the input environmental sound, the communication unit 230 may receive an indication of a failure in recognizing the input environmental sound.

After receiving the selected label and/or one or more sound models from the server 130, the client device 120 outputs the selected label to the user and receives a user input, at 416. In this operation, the user is allowed to verify the accuracy of the selected label. For example, the user may confine if the selected label is correct, or provide a correct label if the selected label is inaccurate. In one embodiment, if the user fails to provide a response on the selected label, it may be assumed that the selected label is correct.

Based on the selected label, the one or more sound models received from the server 130 and/or the user input on the selected label, the client database 260 is updated, at 418. For example, the updating operation may be implemented by adding the selected label and an associated sound model as a new entry in the client database 260, so that the newly added sound model and selected label may be used later in recognizing input environmental sound. Alternatively, the updating operation may be implemented by merging or replacing a predetermined sound model in the client database 260, with the sound model associated with the selected label. In some embodiments, the input from the user in the client device 120 is transmitted to the server 130 so that the server 130 may update the server database 340 in a manner similar to updating the client database 260. In some other embodiments, the updating operation may be implemented based on the received sound models and other types of information described above.

Figure 4B:
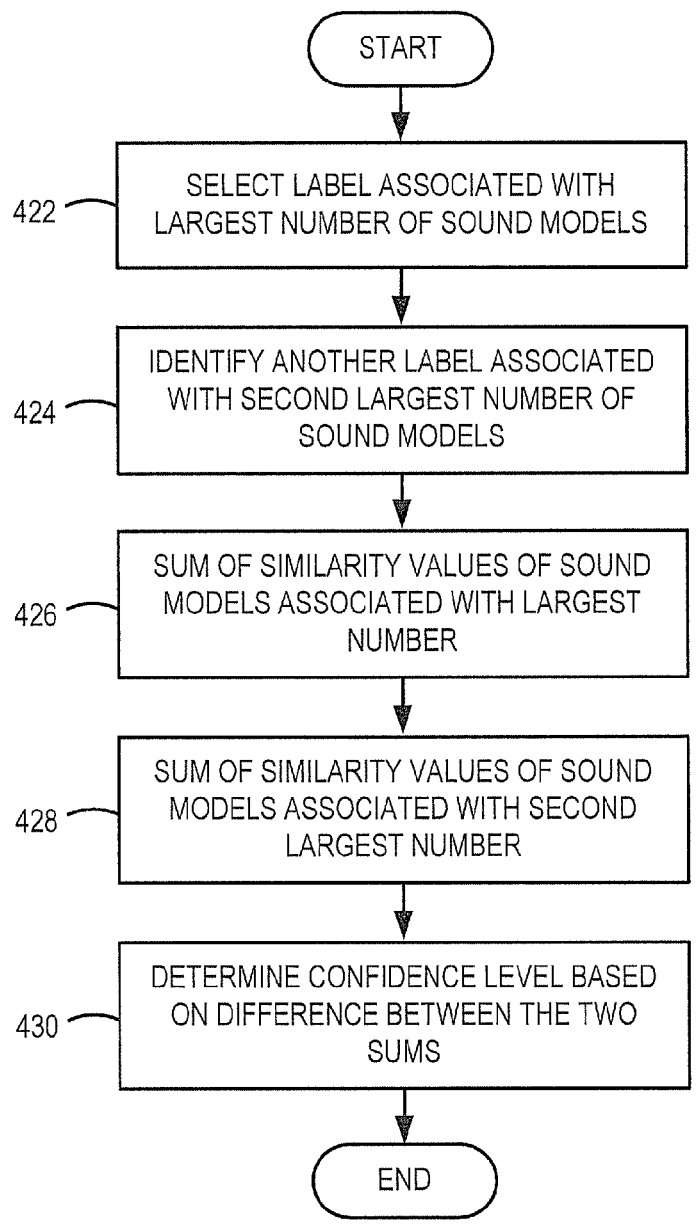
FIGS. 4B to 4D are more detailed flowcharts of 408 in FIG. 4A for selecting a label for an input environmental sound and determining a confidence level of the label according to some embodiments of the present disclosure.

FIG. 4B is a more detailed flowchart of 408 in FIG. 4A, performed by the sound recognition unit 220, for selecting a label for an input environmental sound and determining a confidence level of the selected label according to one embodiment of the present disclosure. At 422, the sound recognition unit 220 selects a first label associated with the largest number of sound models among the one or more sound models identified as being similar to the input sound model. For selecting the label, the labels of the similar sound models can be examined and a number of the similar sound models may be determined for each label. Thus, the first label is a label attributed to the largest number of sound models. Then, a second label associated with the second largest number of sound models among the similar sound models is selected, at 424. Selecting the second label may be based on the number of similar sound models determined in connection with 422. The sound recognition unit 220 then calculates a sum of similarity values (e.g., probabilities or distances) between the input sound model and the sound models associated with the first label, at 426, and a sum of similarity values between the input sound model and the sound models associated with the second label, at 428. The difference between the above two sums is determined to be the confidence level, at 430. In an alternative embodiment, the sum associated with the first label may be determined to be the confidence level.

Figure 4C:
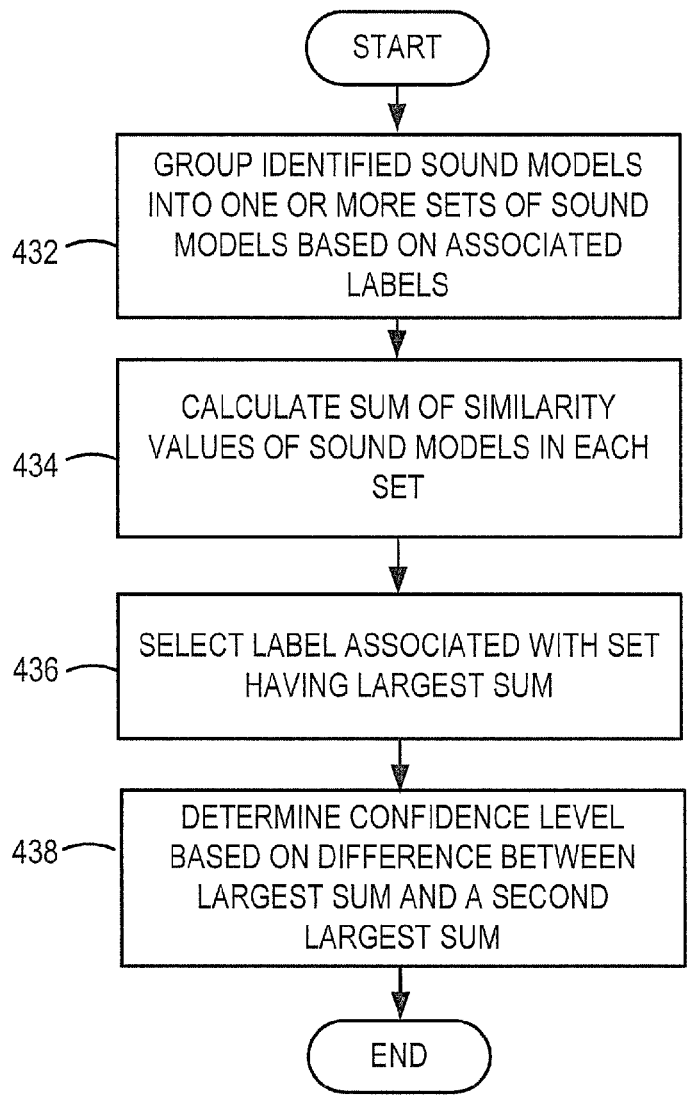

FIG. 4C is a more detailed flowchart of 408 in FIG. 4A, performed by the sound recognition unit 220, according to another embodiment. Initially, the similar sound models are grouped into one or more sets of sound models based on their associated labels, at 432 such that each set of sound models is associated with a unique label. For each set of sound models, the sound recognition unit 220 calculates a sum of the similarity values between the input sound model and each of the sound models, at 434. Among the sums of similarity values, the sound recognition unit 220 determines and selects a label associated with the largest sum, at 436. A second largest sum is identified among the sums of the similarity values, and the confidence level of the selected label is determined based on a difference between the largest sum and the second largest sum, at 438. In an alternative embodiment, the largest sum may be determined to be the confidence level.

Figure 4D:
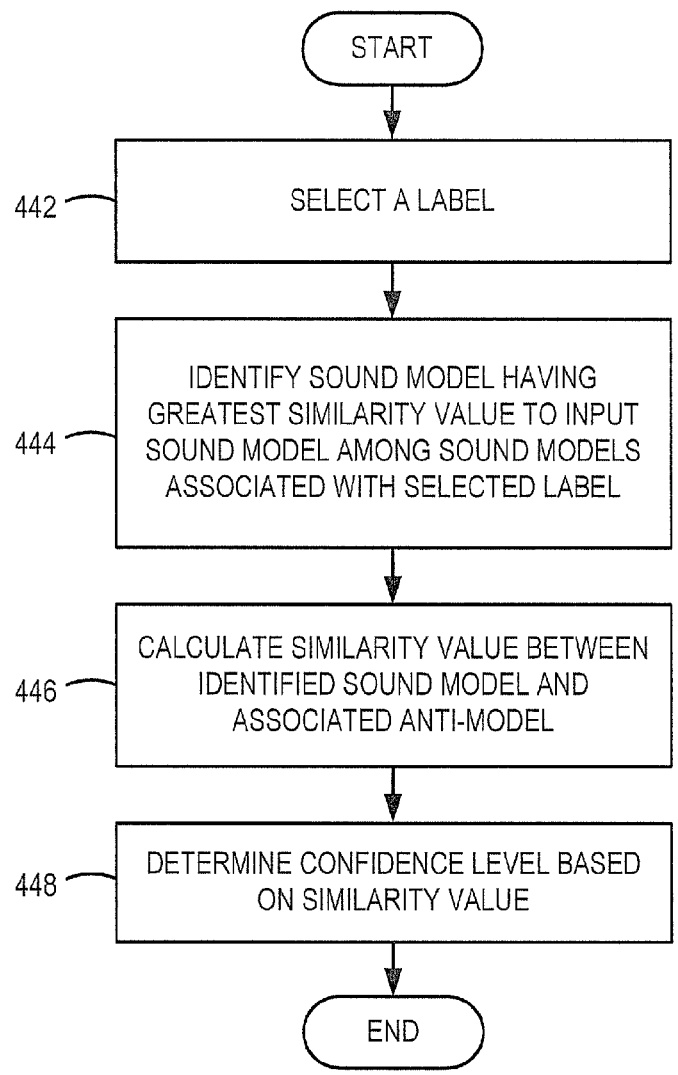

FIG. 4D is a more detailed flowchart of 408 in FIG. 4A, performed by the sound recognition unit 220, according to one embodiment. At 442, the sound recognition unit 220 selects a label associated with the largest number of sound models among the similar sound models, as described above with reference to 422 of FIG. 4B. Alternatively, a label associated with the set of sound models having the largest sum of similarity values may be selected, as described above with reference to 432 to 436 of FIG. 4C. Then, a sound model having the greatest similarity to the input sound model is identified among the sound models associated with the selected label, at 444.

A similarity value between the identified sound model and its anti-model is calculated, at 446. The anti-model may be predetermined and loaded from the client database 260, which includes both sound models and their anti-models. An anti-model may be generated based on sound models, which are similar to but distinguishable from a sound model associated with the anti-model, so as to improve the recognition accuracy. When using descriptive labels, users may verify a recognized label for some of the sound models as being correct or incorrect. Sound models, for which the recognized label has been determined to be incorrect, can be merged or averaged to be an anti-model associated with the label and a sound model for which the recognized label has been determined to be correct. At 448, the calculated similarity value determined at 446 is set and used as the confidence level.

As described above, an input sound model may be represented by a histogram. In some embodiments, the input sound model is generated from the input environmental sound by constructing a histogram (e.g. a Gaussian histogram) based on sound features of the input environmental sound. Environmental sounds obtained in different environments may have different distributions of sound features. The distribution of sound features may be represented by a "histogram." Thus, a histogram of sound features may be used rather than respective sound features in representing the sound environments. In general, a histogram may represent an approximation of the frequency distribution of data points such as feature vectors representing sound features.

An environmental sound captured for a relatively long period of time (e.g., several seconds) generally provides a better representation of a sound environment than an environmental sound captured in a shorter period of time. In addition, sound features extracted from an environmental sound generally exhibit a characteristic distribution for the sound environment. For example, an environmental sound obtained in a crowded restaurant may exhibit a greater number of sound features relating to tableware sounds, human voices, background music, etc., but a fewer number of sound features relating to outdoor sounds such as engine noise, wind noise, etc. Thus, a histogram of sound features can be used to represent a sound model.

Figure 5:
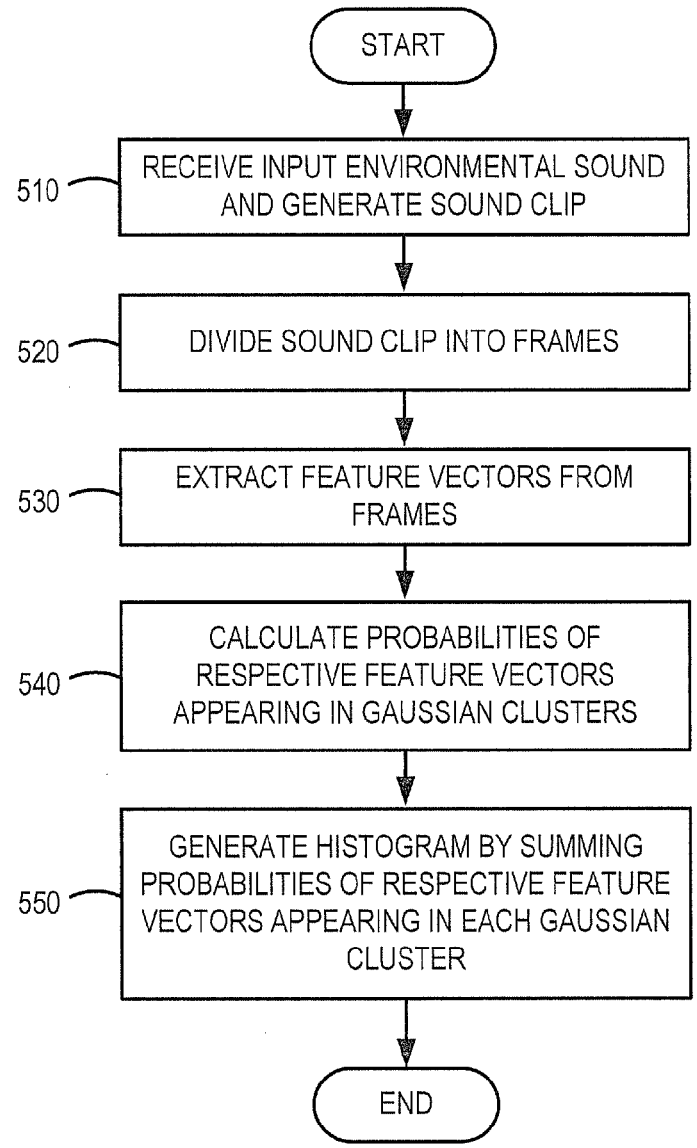
FIG. 5 illustrates a flowchart of a method for generating a sound model by constructing a histogram based on feature vectors extracted from an input environmental sound according to one embodiment of the present disclosure.

FIG. 5 illustrates a flowchart of a method for generating a sound model by constructing a histogram based on feature vectors extracted from an input environmental sound according to one embodiment of the present disclosure. The method shown in FIG. 5 may be performed at 404 in FIG. 4A to generate a histogram as an input sound model.

The input environmental sound detected by the sound sensor 210 is received and segmented into a sound clip of a predetermined time period, at 510. The sound clip is then divided into frames, at 520. In some embodiments, the frames are non-overlapping waveform signals and each frame has a length of a specified time period. From each of frames, a feature vector including MFCCs as components is extracted, at 530.

After extracting a feature vector from each frame, at 530, the probability of each Gaussian cluster for each feature vector is calculated, at 540. In this operation, $P(x_i)$ representing the probability of a feature vector $x_i$, which appears in the entire distribution represented by GMM, is determined. For example, given a sound clip $A_m$ of L frames, a feature vector $x_i$ from the i-th frame that is represented by a universal GMM can be calculated as follows:

$$P(x_i) = \sum_j f_j(x_i) = \sum_j w_j N(x_i | \mu_j, \Sigma_j) \quad \text{(Equation 2)}$$

where $P(x_i)$ represents the probability of $x_i$ appearing in the entire distribution represented by GMM, $f_j(x_i)$ represents the likelihood of the j-th Gaussian cluster for $x_i$, N represents a normal distribution of a Gaussian cluster having the mean value y and the variance $\Sigma$, and $w_j$ represents the prior probability of the j-th Gaussian cluster.

Then, using $f_j(x_i)$ to represent the likelihood of the j-th Gaussian cluster for $x_i$, the probability of each Gaussian cluster for each feature vector can be represented by the following equation:

$$P(f_j | x_i) = \frac{f_j(x_i)}{\sum_j f_j(x_i)} \quad \text{(Equation 3)}$$

Equation 3 above represents the probability that the feature vector $x_i$ appears in the Gaussian cluster $f_j$, or the probability that the Gaussian cluster $f_j$ includes feature vector $x_i$.

The probabilities of feature vectors extracted from the sound clip are then summed for each Gaussian cluster, to obtain a histogram count for each Gaussian cluster, at 550. Thus, the histogram count of Gaussian cluster $f_j$ is the summation of $P(f_j|x_i)$ over all feature vectors corresponding to all frames in the sound clip $A_m$. In some embodiments, the histogram count may be normalized with the sound clip length or the number of frames L in the sound clip. For example, the histogram count of Gaussian cluster $f_j$ for the sound clip $A_m$ may be represented by the following equation:

$$h_j(A_m) = \frac{1}{L}\sum_{i=1}^{L} P(f_j|x_i) \quad \text{(Equation 4)}$$

Equation 4 above may be understood as representing an approximate frequency at which the Gaussian cluster $f_j$ appears in the entire sound clip $A_m$.

Based on the histogram counts for the Gaussian clusters, a histogram that represents the sound clip is generated, at 550. In some embodiments, the normalized histogram representation of the sound clip $A_m$ may be given as follows:

$$H(A_m) = [h_1(A_m) h_2(A_m) \ldots h_K(A_m)] \quad \text{(Equation 5)}$$

where K is the number of Gaussian clusters that represent the entire set of sound features in the GMM.

Further, as discussed above, the input environmental sound may be associated with a location where the input environmental sound is detected and/or a time when the input environmental sound is detected. Other types of information, such as the user's gender or age, device information, and the like, may also be associated with the input environmental sound. The location and/or time may be utilized to improve the accuracy in recognizing the input environmental sound, as described in FIG. 6.

Figure 6:
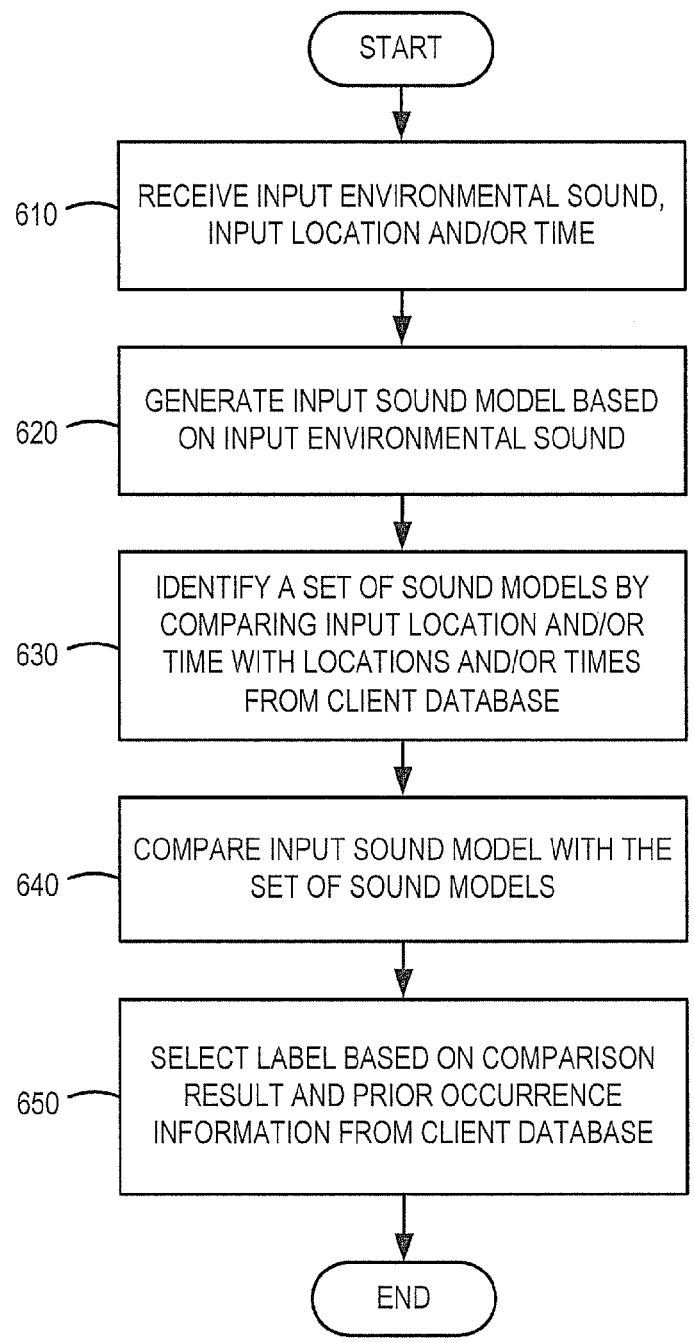
FIG. 6 illustrates a flowchart of a method, performed by a client device, for recognizing an input environmental sound by using information associated with the input environmental sound according to one embodiment of the present disclosure.

FIG. 6 illustrates a flowchart of a method, performed by the client device 120, for recognizing an input environmental sound by using information associated with the input environmental sound according to one embodiment of the present disclosure. The sound recognition unit 220 of the client device 120 receives the input environmental sound detected by the sound sensor 210, at 610. The sound recognition unit 220 also receives an input location and/or time associated with the input sound model, at 610. The input location and time may be obtained internally or externally through a network, as described above.

The sound recognition unit 220 of the client device 120 generates an input sound model based on the input environmental sound, at 620. In some embodiments, the client device 120 obtains the input sound model by constructing a Gaussian histogram as described above, based on the input environmental sound.

The input location and/or time is then compared with predetermined locations and/or times associated with predetermined sound models in the client database 260, at 630. In this operation, any type of generally known matching methods, such as string matching methods, may be employed for matching the input location and/or time to any one of the predetermined locations and/or times.

At 640, based on the comparison result at 630, the sound recognition unit 220 of the client device 120 compares the input sound model with predetermined sound models from the client database 260, so as to identify one or more predetermined sound models that are similar to the input sound model. In some embodiments, predetermined sound models, which are associated with predetermined locations and/or times that do not match the input location and/or time, are filtered out before being compared with the input sound model, at 640. Thus, only predetermined sound models associated with predetermined locations and/or times matching the input location and/or time are considered in recognizing the input environmental sound. Such filtering operation decreases the recognition time of the input environmental sound by reducing the number of predetermined sound models to be compared with the input sound model. The filtering operation also enhances accuracy of the recognition by ignoring predetermined sound models that are coincidentally similar but irrelevant to the input sound model in terms of location or time. In some embodiments, instead of being filtered, some predetermined sound models may be given a lower preference or weight in sound recognition than those matching the input location and/or time. The comparison of the sound models may be performed by calculating the distance between each of the predetermined sound models and the input sound model as described above with reference to FIG. 4A.

A client device 120 selects a label based on the comparison result and prior occurrence information from the client database 260, at 650. In addition to the location and/or time, this operation considers statistics related to prior occurrences of environmental sounds as prior probability in recognizing the input environmental sound. In general, the same type of environmental sounds may occur dominantly and regularly in a particular location and/or time. For example, in a populated city during rush hour, traffic sounds may have a higher probability of being detected than other type of sounds. Thus, it may be assumed that a particular set of sound models may be recognized more frequently than other sound models at a particular location and/or time. Based on this observation, an input environmental sound in a particular location and/or time may be expected to have a higher probability of matching frequently recognized sound models in such location or time. Thus, utilizing prior occurrence statistics may improve the recognition accuracy.

In using prior occurrence information, the client database 260 may also include prior occurrence information including sound occurrence probability information at a particular time or location. In the prior occurrence information, a higher preference or weight may be given to predetermined sound models with higher prior occurrence than predetermined sound models with lower occurrence.

In some embodiments, the operation for selecting the label in FIG. 6 is implemented by determining a confidence level of the selected label as described above with reference to FIGS. 4B to 4D. Although the method of FIG. 6 has been described above to be performed in the client device 120, the method may also be performed in a similar manner by the server 130 in some embodiments.

Figure 7:
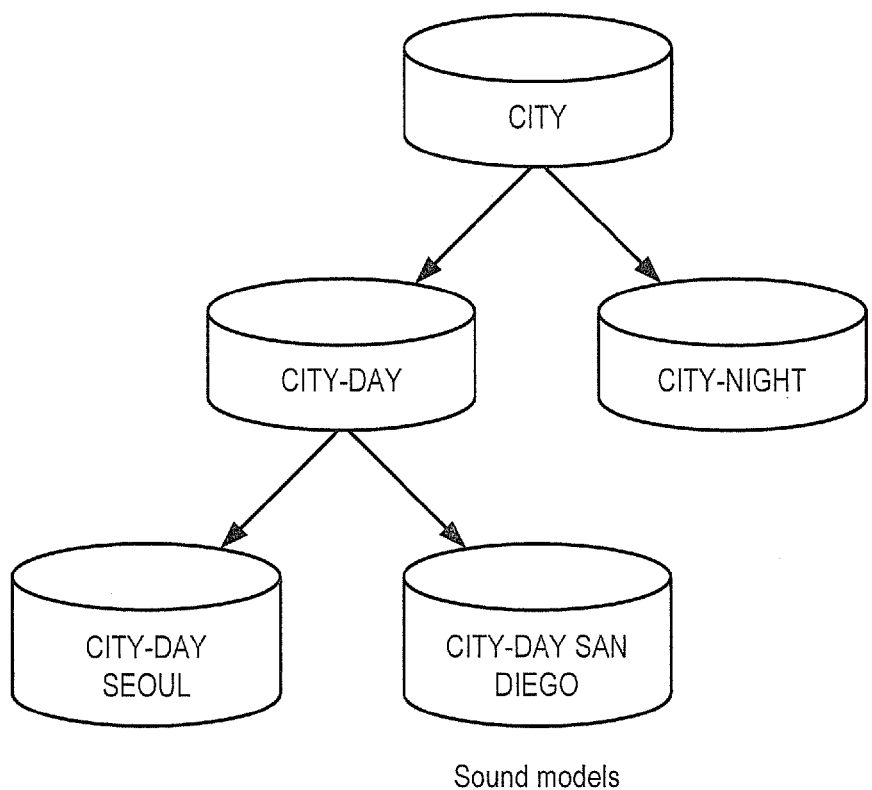
FIG. 7 is a schematic diagram of a database structure of location-dependent and/or time-dependent sound models.

FIG. 7 is a schematic diagram of an exemplary database structure of location-dependent and time-dependent sound models. The database shown in FIG. 7 may be implemented either in the client database 260 or in the server database 340. The location-dependent and time-dependent sound models may be stored along with associated locations and times in the database.

As shown in FIG. 7, sound models representing the same type of environmental sound (e.g., traffic sound) may be generated and stored for different locations and times. For example, the traffic sound of Seoul may be different from that of San Diego. Thus, there may be more than one similar traffic sound models associated with different locations, one associated with the location "Seoul," and another associated with the location "San Diego." Thus, similar environmental sounds detected at different locations or times may be represented by similar sound models associated with different locations and times.

In some embodiments, if sound models obtained from similar locations or similar times are statistically similar to each other, those sound models may be merged with each other, which will be described in detail below with reference to FIG. 10. For example, the merging may be performed by simply averaging the sound models.

As there may be a huge number of sound models, in some embodiments, the sound models may be classified and stored in the database according to multi-level structured categories of times and locations, which may serve to save time in looking up a particular sound model among the stored sound models. In some embodiments, a plurality of sound models representing different sound patterns may be associated with the same kind of circumstances in similar locations and times. For example, there may be multiple types of trains or buses running in the same city, which generate different sound patterns.

FIG. 8 is an exemplary client or server database of sound models and information associated with the sound models, according to one embodiment of the present disclosure. The database includes sound models such as histograms, corresponding anti-models, labels, locations, times, and prior occurrence information. In this case, the prior occurrence information indicates the number of occurrences of respective sound models being recognized in the associated times and locations.

In some embodiments, sound models related to the same type of environmental sound are stored in association with locations and/or times of different data hierarchical levels in the client or server database. For example, histogram A (labeled as "street-traffic") is associated with a location "Seoul," while the histogram D is associated with a location "City" which is a higher level than the location "Seoul" of histogram A.

In some embodiments, each label may identify at least one sound model. For example, a label "street-traffic" identifies sound models represented by histograms A to D while a label "office-speech" identifies a sound model represented by a histogram E, as shown in FIG. 8. Such labels may be selected to recognize an environmental sound represented by associated sound models in sound recognition performed by a client device, as described above with reference to FIGS. 4A to 4D. Also, the labels associated with sound models may be selected and used in environmental sound recognition performed by a server, which will be described below with reference to FIG. 9.

Figure 9:
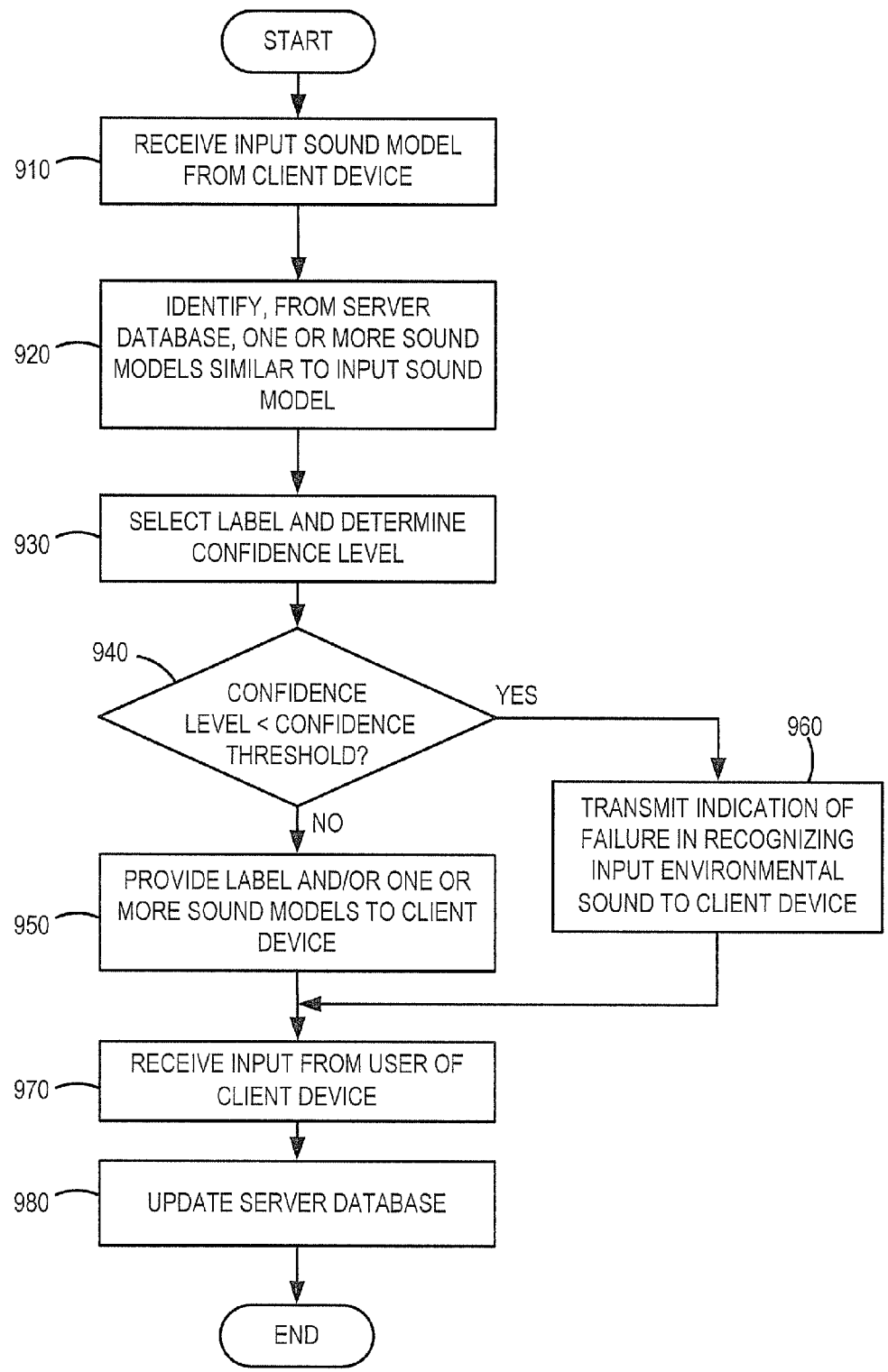
FIG. 9 illustrates a flowchart of a method, performed by a server, for recognizing an environmental sound according to one embodiment of the present disclosure.

FIG. 9 illustrates a flowchart of a method, performed by the server 130, for recognizing an environmental sound according to one embodiment of the present disclosure.

The communication unit 320 of the server 130 receives an input sound model from the client device 120, at 910. Alternatively, the communication unit 130 may receive an input environmental sound from the client device 120, and the server 130 may construct an input sound model based on the input environmental sound. In this case, the input sound model is constructed based on a sound feature extracted from the input environmental sound, as describe above. Further, the communication unit 320 may receive additional information, from the client device 120, such as an input location and/or time.

At 920, the sound recognition unit 310 of the server 130 identifies, from the server database 340, one or more sound models similar to the input sound model, e.g., by employing the method as described above with reference to FIG. 4A. In some embodiments, the server database 340 includes predetermined sound models and associated information, such as anti-models, labels, thresholds, locations, times, prior occurrence information, as shown in FIG. 8. In this case, in the sound recognition unit 310, the one or more sound models are identified by comparing the input location and/or time with locations and/or times associated with the predetermined sound models in a similar manner to the method described above with reference to FIG. 6.

At 930, the sound recognition unit 310 of the server 130 then selects a label for the input environmental sound and determines a confidence level of the selected label. This operation may be performed similarly to the methods described above with reference to FIGS. 4B to 4D. If the confidence level is determined to be equal to or greater than a predetermined confidence threshold ("NO" at 940), the communication unit 320 of the server 130 provides the selected label to the client device 120, at 950. The communication unit 320 of the server 130 may also provide one or more sound models associated with the selected label to the client device 120, so that the client database 260 of client device 120 is updated based on the provided sound models and the selected label. Additionally, the communication unit 320 may transmit additional information associated with the sound models, such as locations, times, anti-models, prior occurrence information, etc., which may be later used in recognizing an input environmental sound in the client device 120.

After providing the selected label and associated sound models at 950, the communication unit 320 of the server 130 may receive an input from a user of the client device 120 on accuracy of the selected label, at 970. For example, the user input may include information on whether the selected label is correct, or a correct label if the selected label is incorrect. Based on the user input from the client device 120, the database updating unit 330 of the server 130 updates the sound models and/or associated information, such as prior occurrence information, stored in the server database 340, at 980. For example, if the user input indicates that the selected label is correct, the prior occurrence information associated with the label may be updated to indicate that the number of occurrences of the associated sound models is adjusted to be higher.

On the other hand, if the confidence level is less than the predetermined confidence threshold ("YES" at 940), the communication unit 320 of the server 130 transmits an indication of a failure in recognizing the input environmental sound to a client device 120, at 960. Upon receiving such indication, the client device 120 may request a user to provide a correct label for the input environmental sound, at 970. In this case, when the user provides the correct label, the client device 120 transmits the provided label to the server 130. Based on the received label and the input sound model, the server 130 updates the sound models and/or associated information in the server database 340, at 980, so that the input sound model may be stored as a new entry in the server database 340.

Figure 10:
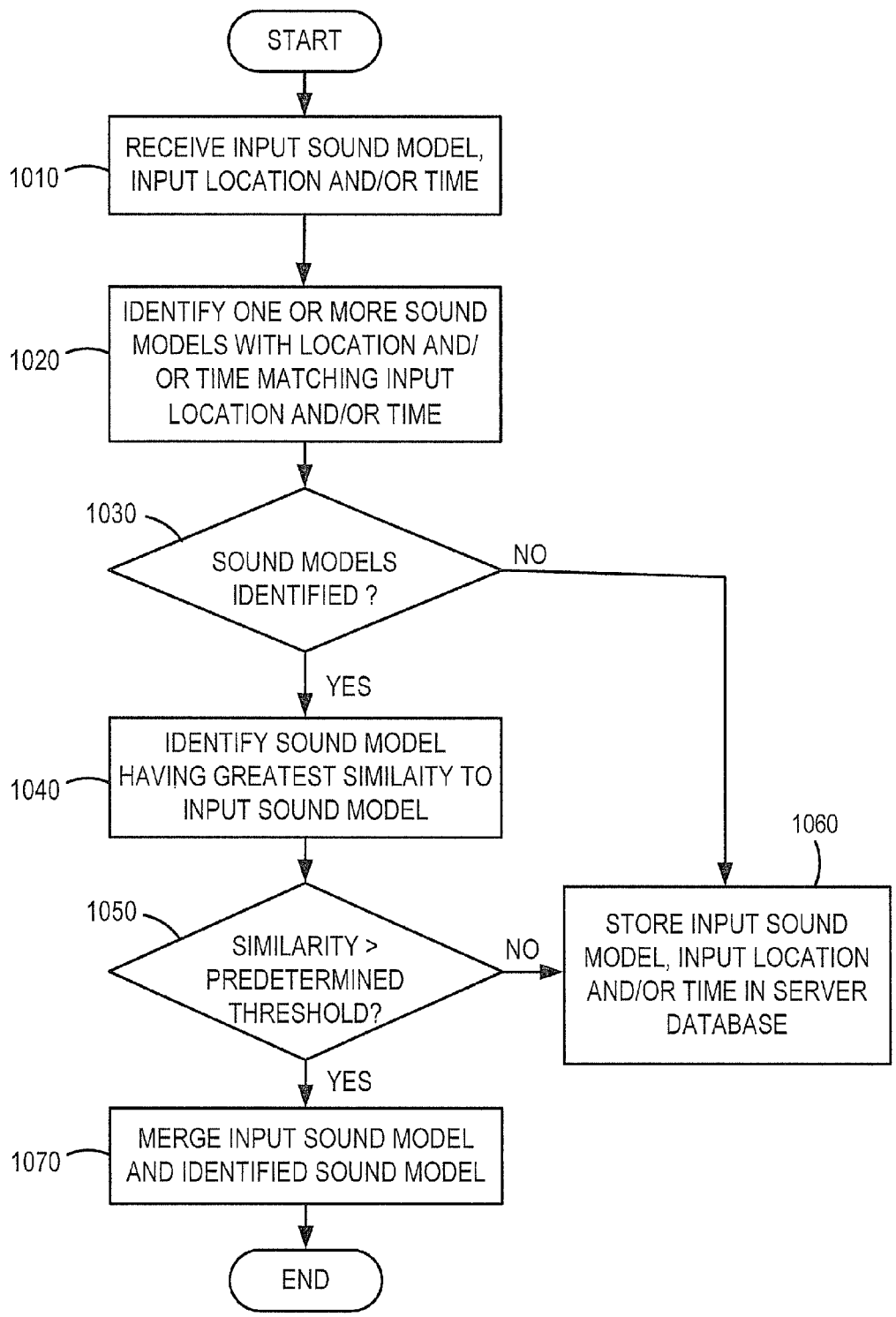
FIG. 10 illustrates a flowchart of a method for updating a database of sound models by using location and/or time information associated with sound models according to one embodiment of the present disclosure.

FIG. 10 illustrates a flowchart of a method, performed by the server 130, for updating a sound model in a database by using a location and/or time associated with the sound model according to one embodiment of the present disclosure. Although the method as shown in FIG. 10 is described to update the server database 340, this method may also be employed to update the client database 260. Specifically, this method may be used in updating the client database 260 at 418 of the method shown in FIG. 4A or updating the server database 340 at 980 of the method shown in FIG. 9.

At 1010, an input sound model, and an input location and/or time associated with the input sound model are received by the communication unit 320 of the server 130. The sound recognition unit 310 of the server 130 then identifies, from the server database 340, one or more sound models that are associated with locations and/or times matching the input location and/or time, at 1020.

If any sound models are identified ("YES" at 1030), the sound recognition unit 310 identifies a sound model having the greatest similarity to the input sound model among the identified sound models, at 1040. In some embodiments, a similarity may be determined based on the distance between the input sound model and each of the sound models as described above with reference to FIG. 4A.

The sound recognition unit 310 of the server 130 then compares the similarity with a predetermined similarity threshold, at 1050. If the similarity is determined to be equal to or greater than the predetermined similarity threshold ("YES" at 1050), the database updating unit 330 merges the input sound model and the identified sound model having the greatest similarity to the input sound model, at 1070. In some embodiments, the merging may be performed by simply averaging the sound models.

On the other hand, if any sound models associated with locations and/or times matching the input location and/or time are not identified from the server database 340 ("NO" at 1030), then the input sound model, and the input location and/or time are stored as a new entry in the server database 340, at 1060. Also, if the similarity is determined to be less than the predetermined similarity threshold ("NO" at 1050), the same operation is performed, at 1060.

Figure 11:
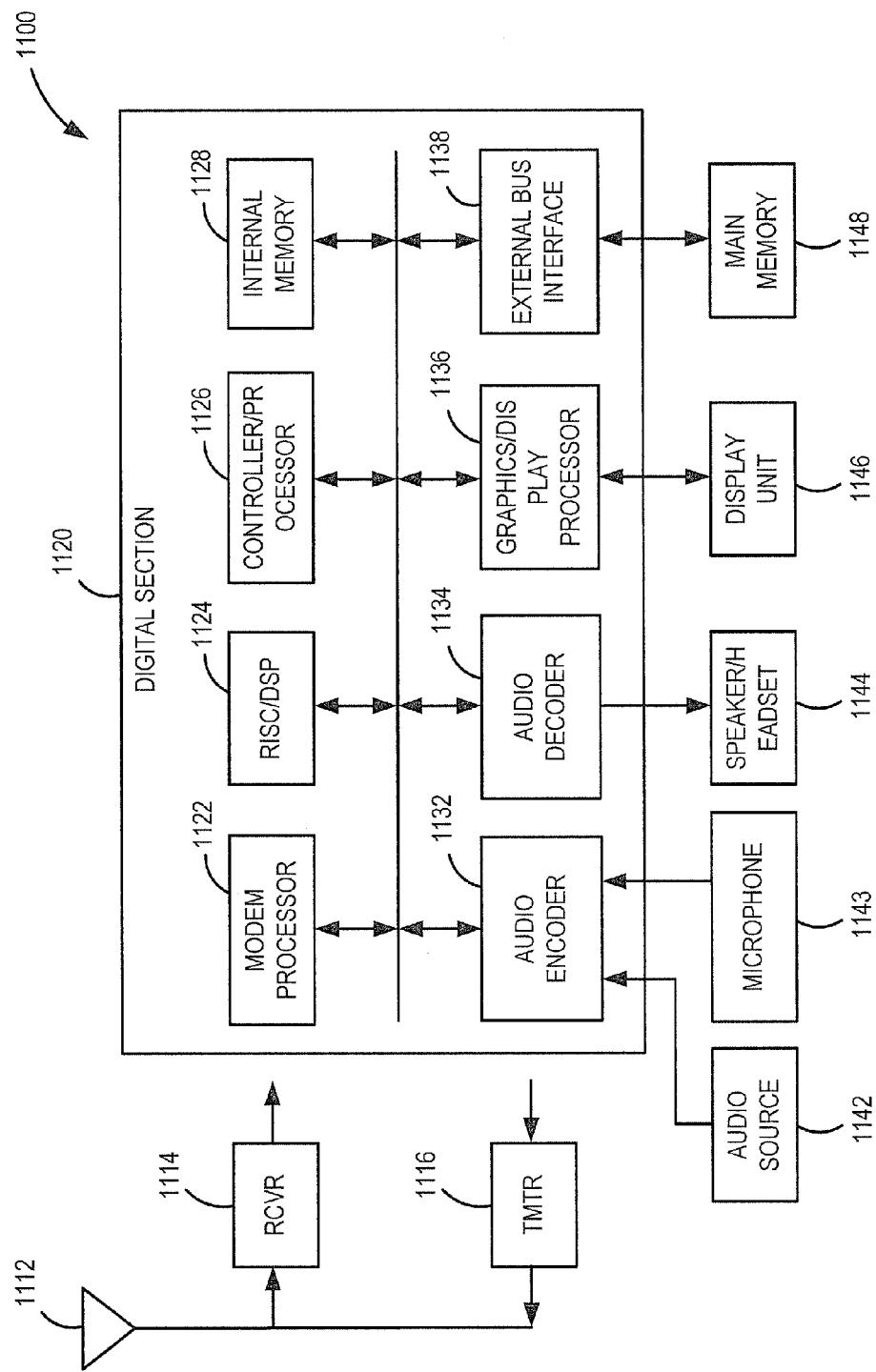
FIG. 11 shows a configuration of an exemplary mobile device in a wireless communications system.

FIG. 11 shows a configuration of an exemplary mobile device 1100 in a wireless communication system. The configuration of the mobile device 1100 may be implemented in the client devices 120, 150, 160, 170, and 180. The mobile device 1100 may be a cellular phone, a terminal, a handset, a personal digital assistant (PDA), a wireless modem, a cordless phone, etc. The wireless communication system may be a Code Division Multiple Access (CDMA) system, a Global System for Mobile Communications (GSM) system, Wideband CDMA (WCDMA) system, Long Tern Evolution (LTE) system, LTE Advanced system, etc. Further, the mobile device 1100 may communicate directly with another mobile device, e.g., using Wi-Fi Direct, Bluetooth, or FlashLing technology.

The mobile device 1100 is capable of providing bidirectional communication via a receive path and a transmit path. On the receive path, signals transmitted by base stations are received by an antenna 1112 and are provided to a receiver (RCVR) 1114. The receiver 1114 conditions and digitizes the received signal and provides samples such as the conditioned and digitized digital signal to a digital section for further processing. On the transmit path, a transmitter (TMTR) 1116 receives data to be transmitted from a digital section 1120, processes and conditions the data, and generates a modulated signal, which is transmitted via the antenna 1112 to the base stations. The receiver 1114 and the transmitter 1116 may be part of a transceiver that may support CDMA, GSM, LTE, LTE Advanced, etc.

The digital section 1120 includes various processing, interface, and memory units such as, for example, a modem processor 1122, a reduced instruction set computer/digital signal processor (RISC/DSP) 1124, a controller/processor 1126, an internal memory 1128, a generalized audio encoder 1132, a generalized audio decoder 1134, a graphics/display processor 1136, and an external bus interface (EBI) 1138. The modem processor 1122 may perform processing for data transmission and reception, e.g., encoding, modulation, demodulation, and decoding. The RISC/DSP 1124 may perform general and specialized processing for the mobile device 1100. The controller/processor 1126 may perform the operation of various processing and interface units within the digital section 1120. The internal memory 1128 may store data and/or instructions for various units within the digital section 1120.

The generalized audio encoder 1132 may perform encoding for input signals from an audio source 1142, a microphone 1143, etc. The generalized audio decoder 1134 may perform decoding for coded audio data and may provide output signals to a speaker/headset 1144. The graphics/display processor 1136 may perform processing for graphics, videos, images, and texts, which may be presented to a display unit 1146. The EBI 1138 may facilitate transfer of data between the digital section 1120 and a main memory 1148.

The digital section 1120 may be implemented with one or more processors, DSPs, microprocessors, RISCs, etc. The digital section 1120 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for recognizing an environmental sound at a client device, the method comprising:
   accessing a client database including a plurality of sound models representing environmental sounds and a plurality of labels, wherein each of the plurality of labels identifies at least one of the plurality of sound models;
   receiving an input environmental sound and generating an input sound model based on the input environmental sound;
   determining similarity values between the input sound model and the plurality of sound models to identify one or more sound models of the plurality of sound models that are similar to the input sound model;
   selecting a first label from one or more labels, of the plurality of labels, associated with the one or more sound models;
   associating the first label with the input environmental sound based on a confidence level of the first label; and
   if the confidence level is less than a confidence threshold:
      transmitting the input sound model to a server; and
      receiving a second label identifying the input environmental sound from the server.

2. The method of claim 1, wherein the input sound model is generated based on a sound feature extracted from the input environmental sound.

3. The method of claim 1, wherein the first label is associated with a largest number of sound models among the one or more sound models.

4. The method of claim 3, wherein another label is associated with a second largest number of sound models among the one or more sound models, and wherein the confidence level is determined based on a difference between a sum of the similarity values of the one or more sound models associated with the largest number and a sum of the similarity values of the one or more sound models associated with the second largest number.

5. The method of claim 1, wherein selecting the first label comprises:
   grouping the one or more sound models into one or more sets of sound models based on the one or more labels;
   for each set of the one or more sets of sound models, calculating a sum of the similarity values of sound models in the set to determine a largest sum; and selecting a particular label associated with a set of the one or more sets having the largest sum.

6. The method of claim 5, wherein the confidence level is determined based on a difference between the largest sum and a second largest sum of the sums determined for the one or more sets of sound models.

7. The method of claim 1, wherein the confidence level is determined based on a sum of the similarity values of the one or more sound models associated with the first label.

8. The method of claim 1, wherein a first sound model having a greatest similarity value to the input sound model is identified among the one or more sound models associated with the first label, and wherein the confidence level is determined based on a similarity between the first sound model and an associated anti-model.

9. The method of claim 1, further comprising:
receiving, from the server, one or more server sound models similar to the input sound model; and
updating the client database based on the second label and the one or more server sound models.

10. The method of claim 9, further comprising:
receiving, from the server, at least one of location information or time information associated with each of the one or more server sound models; and
updating the client database based on the at least one of the location information and the time information associated with the one or more server sound models.

11. The method of claim 9, wherein updating the client database comprises:
outputting the second label;
receiving an input indicating whether the second label matches the input environmental sound; and
updating the client database based on the input.

12. The method of claim 1, further comprising:
receiving location information associated with the input sound model,
wherein the client database further includes information corresponding to at least one of a location or a time associated with each of the plurality of sound models.

13. The method of claim 12, wherein determining the similarity value comprises:
filtering the plurality of sound models based on the location information to identify the one or more sound models.

14. The method of claim 12, wherein the client database further comprises prior occurrence information associated with each of the plurality of sound models, and wherein the one or more sound models are identified based on the prior occurrence information.

15. The method of claim 1, wherein the determining the similarity values, the selecting the first label, and the associating the first label are performed within a device that comprises a mobile communication device.

16. The method of claim 1, wherein the determining the similarity values, the selecting the first label, and the associating the first label are performed within a device that comprises a base station.

17. A method for recognizing an input environmental sound at a server, the method comprising:
if a confidence level determined by a client device and associated with a first label associated with an input environmental sound received at the client device is less than a first confidence threshold:
accessing a server database including a plurality of sound models representing environmental sounds and a plurality of labels, wherein each of the plurality of labels identifies at least one of the plurality of sound models;
receiving, from the client device, an input sound model representing the input environmental sound;
determining similarity values between the input sound model and the plurality of sound models to identify one or more sound models of the plurality of sound models that are similar to the input sound model;
selecting a second label from one or more labels, of the plurality of labels, associated with the one or more sound models;
associating the second label with the input environmental sound based on a confidence level of the second label; and
sending the second label or an indication of a failure in recognizing the input environmental sound to the client device based on the confidence level of the second label.

18. The method of claim 17, further comprising:
if the confidence level of the second label is greater than or equal to a second confidence threshold, providing the second label and the one or more sound models to the client device.

19. The method of claim 18, further comprising:
providing at least one of location information and time information associated with each of the one or more sound models to the client device.

20. The method of claim 18, further comprising:
receiving an input from a user of the client device indicating whether the second label matches the input environmental sound; and
updating the server database based on the input from the user.

21. The method of claim 18, further comprising:
receiving at least one of location information and time information associated with the input sound model from the client device,
wherein the server database comprises information corresponding to at least one of a location and a time associated with each of the plurality of sound models.

22. The method of claim 21, wherein determining the similarity values comprises:
filtering the plurality of sound models based on the at least one of the location information and the time information to identify the one or more sound models.

23. The method of claim 21, wherein the server database further comprises prior occurrence information associated with each of the plurality of sound models, and wherein the one or more sound models are identified based on the prior occurrence information.

24. The method of claim 21, further comprising, if the confidence level of the second label is less than the second confidence threshold:
providing the client device with the indication of the failure in recognizing the input environmental sound;
identifying a set of the one or more sound models with information corresponding to at least one of a first location and a first time that match the at least one of the location information and the time information;
identifying a first sound model having a greatest similarity to the input sound model from the set; and
if the similarity between the input sound model and the first sound model is greater than or equal to a similarity threshold, merging the input sound model and the first sound model in the server database.

25. The method of claim 24, further comprising:
if the similarity between the input sound model and the first sound model is less than the similarity threshold, storing the input sound model in the server database.

26. The method of claim 17, wherein the first label is associated with a largest number of sound models among the one or more sound models.

27. The method of claim 26, wherein another label is associated with a second largest number of sound models among the one or more sound models, and wherein the confidence level of the second label is determined based on a difference between a sum of the similarity values of the one or more sound models associated with the largest number and a sum of the similarity values of the one or more sound models associated with the second largest number.

28. The method of claim 17, wherein selecting the second label comprises:
grouping the one or more sound models into one or more sets of sound models based on the one or more labels;
calculating a sum of the similarity values of sound models in each of the one or more sets to determine a largest sum; and
selecting a particular label associated with a set of the one or more sets having the largest sum.

29. The method of claim 28, wherein a second largest sum is identified among the sums of the similarity values, and wherein the confidence level of the second label is determined based on a difference between the largest sum and the second largest sum.

30. The method of claim 17, wherein the confidence level of the second label is determined based on a sum of the similarity values of the one or more sound models associated with the second label.

31. The method of claim 17, wherein a first sound model having a greatest similarity value to the input sound model is identified among the one or more sound models associated with the second label, and wherein the confidence level of the second label is determined based on a similarity between the first sound model and an associated anti-model.

32. A device for recognizing an environmental sound, the device comprising:
a client database configured to store a plurality of sound models representing environmental sounds and a plurality of labels, wherein each of the plurality of labels identifies at least one of the plurality of sound models;
a sound sensor configured to capture an input environmental sound;
a sound recognition unit configured to:
generate an input sound model from the input environmental sound;
determine similarity values between the input sound model and the plurality of sound models to identify one or more sound models of the plurality of sound models that are similar to the input sound model;
select a first label from one or more labels, of the plurality of labels, associated with the one or more sound models; and
associate the first label with the input environmental sound based on a confidence level of the first label; and
a communication unit configured to:
if the confidence level is less than a confidence threshold, transmit the input sound model to a server; and
receive a second label identifying the input environmental sound from the server.

33. The device of claim 32, wherein the first label is associated with a largest number of sound models among the one or more sound models.

34. The device of claim 33, wherein another label is associated with a second largest number of sound models among the one or more sound models, and wherein the confidence level is determined based on a difference between a sum of the similarity values of the one or more sound models associated with the largest number and a sum of the similarity values of the one or more sound models associated with the second largest number.

35. The device of claim 32, wherein the sound recognition unit is further configured to:
group the one or more sound models into one or more sets of sound models based on the one or more labels;
for each set of the one or more sets of sound models, calculate a sum of the similarity values of sound models the set to determine a largest sum; and
select a particular label associated with a set of the one or more sets having the largest sum.

36. The device of claim 35, wherein the confidence level is determined based on a difference between the largest sum and a second largest sum of the sums determined for the one or more sets of sound models.

37. The device of claim 32, wherein the confidence level is determined based on a sum of the similarity values of the one or more sound models associated with the first label.

38. The device of claim 32, wherein a first sound model having a greatest similarity value to the input sound model is identified among the one or more sound models associated with the first label, and wherein the confidence level is determined based on a similarity between the first sound model and an associated anti-model.

39. The device of claim 32, wherein the communication unit is further configured to receive, from the server, one or more server sound models similar to the input sound model, and further comprising:
a database updating unit configured to update the client database based on the second label and the one or more server sound models.

40. The device of claim 39, wherein the communication unit is further configured to receive, from the server, at least one of location information or time information associated with each of the one or more server sound models, and wherein the database updating unit is further configured to update the client database based on the at least one of the location information or the time information associated with the one or more server sound models.

41. The device of claim 39, further comprising:
a user interface configured to output the second label and to receive an input indicating whether the second label matches the input environmental sound,
wherein the database updating unit is further configured to update the client database based on the input.

42. The device of claim 32, further comprising a communication unit configured to receive location information associated with the input sound model, wherein the client database comprises information corresponding to at least one of a location or a time associated with each of the plurality of sound models.

43. The device of claim 42, wherein the sound recognition unit is further configured to filter the plurality of sound models based on the location information to identify the one or more sound models.

44. The device of claim 42, wherein the client database further comprises prior occurrence information associated with each of the plurality of sound models, and wherein the one or more sound models re identified based on the prior occurrence information.

45. The device of claim 32, wherein the communication unit includes:
   an antenna; and
   a receiver coupled to the antenna and configured to receive location information associated with the plurality of sound models.

46. The device of claim 45, wherein the communication unit further includes a transmitter configured to transmit the input sound model to the server if the confidence level is less than the confidence threshold.

47. The device of claim 32, wherein the sound sensor and the sound recognition unit are integrated into a mobile communication device.

48. The device of claim 32, wherein the sound sensor and the sound recognition unit are integrated into a base station.

49. A server for recognizing an input environmental sound, the server comprising:
   a server database configured to store a plurality of sound models representing environmental sounds and a plurality of labels, wherein each of the plurality of labels identifies at least one of the plurality of sound models;
   a communication unit configured to receive an input sound model representing an input environmental sound from a client device if a confidence level determined by the client device and associated with a first label associated with the input environmental sound is less than a first confidence threshold; and
   a sound recognition unit configured to, if the confidence level determined by the client device is less than the first confidence threshold:
      determine similarity values between the input sound model and the plurality of sound models to identify one or more sound models of the plurality of sound models that are similar to the input sound model;
      select a second label from one or more labels of the plurality of labels associated with the one or more sound models; and
      associate the second label with the input environmental sound based on a confidence level of the first second label,
   wherein the communication unit is further configured to provide the second label or an indication of a failure in recognizing the input environmental sound to the client device based on the confidence level of the second label.

50. The server of claim 49, wherein the communication unit is further configured to provide the first label and the one or more sound models to the client device if the confidence level of the second label is greater than or equal to a second confidence threshold. and wherein the one or more sound models are identified based on the prior occurrence information.

51. The server of claim 50, wherein the communication unit is further configured to provide at least one of location information and time information associated with each of the one or more sound models to the client device.

52. The server of claim 50, wherein the communication unit is further configured to receive an input from a user of the client device indicating whether the second label matches the input environmental sound, and further comprising a database updating unit configured to update the server database based on the input from the user.

53. The server of claim 50, wherein the communication unit is further configured to receive at least one of location information and time information associated with the input sound model from the client device, and wherein the server database comprises information corresponding to at least one of a location and a time associated with each of the plurality of sound models.

54. The server of claim 53, wherein the sound recognition unit is further configured to filter the plurality of sound models based on the at least one of the location information and the time information to identify the one or more sound models.

55. The server of claim 53, wherein the server database further comprises prior occurrence information associated with each of the plurality of sound models, and wherein the one or more sound models are identified based on the prior occurrence information.

56. The server of claim 53, wherein if the confidence level of the second label is less than the second confidence threshold:
   the communication unit provides the client device with an indication of a failure in recognizing the input environmental sound;
   the sound recognition unit identifies a set of the one or more sound models with information corresponding to at least one of a first location and a first time that match the at least one of the location information and the time information and identifies a first sound model having a greatest similarity to the input sound model from the set; and
   a database updating unit merges the input sound model and the first sound model in the server database if the similarity between the input sound model and the first sound model is greater than or equal to a similarity threshold.

57. The server of claim 56, wherein the database updating unit is further configured to store the input sound model in the server database if the similarity between the input sound model and the first sound model is less than the similarity threshold.

58. The server of claim 49, wherein the second label is associated with a largest number of sound models among the one or more sound models.

59. The server of claim 58, wherein another label is associated with a second largest number of sound models among the one or more sound models, and wherein the confidence level of the second label is determined based on a difference between a sum of the similarity values of the one or more sound models associated with the largest number and a sum of the similarity values of the one or more sound models associated with the second largest number.

60. A non-transitory computer-readable medium comprising instructions for recognizing an environmental sound at a client device, the instructions causing a processor to perform operations comprising:
   accessing a client database including a plurality of sound models representing environmental sounds and a plurality of labels, wherein each of the plurality of labels identifies at least one of the plurality of sound models;
   receiving an input environmental sound and generating an input sound model based on the input environmental sound;
   determining similarity values between the input sound model and the plurality of sound models to identify one or more sound models of the plurality of sound models that are similar to the input sound model;
   selecting a first label from one or more labels, of the plurality of labels, associated with the one or more sound models;

associating the first label with the input environmental sound based on a confidence level of the first label; and if the confidence level is less than a confidence threshold:
  transmitting the input sound model to a server; and
  receiving a second label identifying the input environmental sound from the server.

61. The non-transitory computer-readable medium of claim 60, wherein the first label is associated with a largest number of sound models among the one or more sound models.

62. The non-transitory computer-readable medium of claim 61, wherein another label is associated with a second largest number of sound models among the one or more sound models, and wherein the confidence level is determined based on a difference between a sum of the similarity values of the one or more sound models associated with the largest number and a sum of the similarity values of the one or more sound models associated with the second largest number.

63. The non-transitory computer-readable medium of claim 60, wherein selecting the first label comprises:
  grouping the one or more sound models into one or more sets of sound models based on the one or more labels;
  for each set of the one or more sets of the sound models, calculating a sum of the similarity values of sound models in the set to determine a largest sum; and
  selecting a particular label associated with a set of the one or more sets having the largest sum.

64. The non-transitory computer-readable medium of claim 63, wherein the confidence level is determined based on a difference between the largest sum and second largest sum of the sums determined for the one or more sets of sound models.

65. The non-transitory computer-readable medium of claim 60, wherein the confidence level is determined based on a sum of the similarity values of the one or more sound models associated with the first label.

66. The non-transitory computer-readable medium of claim 60, wherein a first sound model having a greatest similarity value to the input sound model is identified among the one or more sound models associated with the first label, and wherein the confidence level is determined based on a similarity between the first sound model and an associated anti-model.

67. The non-transitory computer-readable medium of claim 60, wherein the operations further comprise:
  receiving, from the server, one or more server sound models similar to the input sound model; and
  updating the client database based on the second label and the one or more server sound models.

68. The non-transitory computer-readable medium of claim 67, wherein the operations further comprise:
  receiving, from the server, at least one of location information or time information associated with each of the one or more server sound models; and
  updating the client database based on the at least one of the location information or the time information associated with the one or more server sound models.

69. The non-transitory computer-readable medium of claim 67, wherein updating the client database comprises:
  outputting the second label;
  receiving an input indicating whether the second label matches the input environmental sound; and
  updating the client database based on the input.

70. The non-transitory computer-readable medium of claim 60, wherein the operations further comprise:
  receiving location information associated with the input sound model,
  wherein the client database further includes information corresponding to at least one of a location or a time associated with each of the plurality of sound models.

71. The non-transitory computer-readable medium of claim 70, wherein determining the similarity value comprises:
  filtering the plurality of sound models based on the location information to identify the one or more sound models.

72. The non-transitory computer-readable medium of claim 70, wherein the client database further comprises prior occurrence information associated with each of the plurality of sound models, and wherein the one or more sound models are identified based on the prior occurrence information.

73. A non-transitory computer-readable medium comprising instructions for recognizing an input environmental sound at a server, the instructions causing a processor to perform operations comprising:
  if a confidence level determined by a client device and associated with a first label associated with an input environmental sound received at the client device is less than a first confidence threshold:
    accessing a server database including a plurality of sound models representing environmental sounds and a plurality of labels, wherein each of the plurality of labels identifies at least one of the plurality of sound models;
    receiving, from the client device, an input sound model representing the input environmental sound;
    determining similarity values between the input sound model and the plurality of sound models to identify one or more sound models of the plurality of sound models that are similar to the input sound model;
    selecting a second label from one or more labels, of the plurality of labels, associated with the one or more sound models;
    associating the second label with the input environmental sound based on a confidence level of the second label; and
    sending the second label or an indication of a failure in recognizing the input environmental sound to the client device based on the confidence level of the second label.

74. The non-transitory computer-readable medium of claim 73, wherein the operations further comprise:
  if the confidence level of the second label is greater than or equal to a second confidence threshold, providing the second label and the one or more sound models to the client device.

75. The non-transitory computer-readable medium of claim 74, wherein the operations further comprise:
  providing at least one of location information and time information associated with each of the one or more sound models to the client device.

76. The non-transitory computer-readable medium of claim 74, wherein the operations further comprise:
  receiving an input from a user of the client device indicating whether the second label matches the input environmental sound; and
  updating the server database based on the input from the user.

77. The non-transitory computer-readable medium of claim 74, wherein the operations further comprise:

receiving at least one of location information and time information associated with the input sound model from the client device, wherein the server database comprises information corresponding to at least one of a location and a time associated with each of the plurality of sound models.

78. The non-transitory computer-readable medium of claim 77, wherein determining the similarity value comprises:

filtering the plurality of sound models based on the at least one of the location information and the time information to identify the one or more sound models.

79. The non-transitory computer-readable medium of claim 77, wherein the server database further comprises prior occurrence information associated with each of the plurality of sound models, and wherein the one or more sound models are identified based on the prior occurrence information.

80. The non-transitory computer-readable medium of claim 77, wherein the operations further comprise, if the confidence level of the second label is less than the second confidence threshold:

providing the client device with an indication of a failure in recognizing the input environmental sound;
identifying a set of the one or more sound models with information corresponding to at least one of a first location and a first time that match the at least one of the location information and the time information;
identifying a first sound model having a greatest similarity to the input sound model from the set; and
if the similarity between the input sound model and the first sound model is greater than or equal to a similarity threshold, merging the input sound model and the first sound model in the server database.

81. The non-transitory computer-readable medium of claim 80, wherein the operations further comprise:

if the similarity between the input sound model and the first sound model is less than the similarity threshold, storing the input sound model in the server database.

82. The non-transitory computer-readable medium of claim 73, wherein the second label is associated with a largest number of sound models among the one or more sound models.

83. The non-transitory computer-readable medium of claim 82, wherein another label is associated with a second largest number of sound models among the one or more sound models, and wherein the confidence level of the second label is determined based on a difference between a sum of the similarity values of the one or more sound models associated with the largest number and a sum of the similarity values of the one or more sound models associated with the second largest number.

84. The non-transitory computer-readable medium of claim 73, wherein selecting the second label comprises:

grouping the one or more sound models into one or more sets of sound models based on the one or more labels;
calculating a sum of the similarity values of sound models in each of the one or more sets to determine a largest sum; and
selecting a particular label associated with a set of the one or more sets having the largest sum.

85. The non-transitory computer-readable medium of claim 84, wherein a second largest sum is identified among the sums of the similarity values, and wherein the confidence level of the second label is determined based on a difference between the largest sum and the second largest sum.

86. The non-transitory computer-readable medium of claim 73, wherein the confidence level of the second label is determined based on a sum of the similarity values of the one or more sound models associated with the second label.

87. The non-transitory computer-readable medium of claim 73, wherein a first sound model having a greatest similarity value to the input sound model is identified among the one or more sound models associated with the second label, and wherein the confidence level of the second label is determined based on a similarity between the first sound model and an associated anti-model.

88. An apparatus for recognizing an environmental sound, comprising:

means for storing a plurality of sound models representing environmental sounds and a plurality of labels, wherein each of the plurality of labels identifies at least one of the plurality of sound models;
means for capturing an input environmental sound;
means for generating an input sound model from the input environmental sound;
means for determining similarity values between the input sound model and the plurality of sound models to identify one or more sound models from the means for storing that are similar to the input sound model;
means for selecting a first label from one or more labels, of the plurality of labels, associated with the one or more sound models;
means for associating the first label with the input environmental sound based on a confidence level of the first label;
means for transmitting the input sound model to a server if the confidence level is less than a confidence threshold; and
means for receiving a second label identifying the input environmental sound from the server.

89. The apparatus of claim 88, wherein the first label is associated with a largest number of sound models among the one or more sound models.

90. The apparatus of claim 89, wherein another label is associated with a second largest number of sound models among the one or more sound models, and wherein the confidence level is determined based on a difference between a sum of the similarity values of the one or more sound models associated with the largest number and a sum of the similarity values of the one or more sound models associated with the second largest number.

91. The apparatus of claim 88, wherein the means for selecting is configured to:

group the one or more sound models into one or more sets of sound models based on the one or more labels,
for each set of the one or more sets of the sound models, calculate a sum of the similarity values of sound models in the set to determine a largest sum, and
select a particular label associated with a set of the having the largest sum.

92. The apparatus of claim 91, wherein the confidence level is determined based on a difference between the largest sum and a second largest sum of the sums determined for the one or more sets of sound models.

93. The apparatus of claim 88, wherein the confidence level is determined based on a sum of the similarity values of the one or more sound models associated with the first label.

94. The apparatus of claim 88, wherein a first sound model having a greatest similarity value to the input sound model is identified among the one or more sound models associated with the first label, and wherein the confidence level is determined based on a similarity between the first sound model and an associated anti-model.

95. The apparatus of claim 88, wherein the means for receiving is configured to receive, from the server, one or more server sound models similar to the input sound model, and further comprising:
means for updating the means for storing based on the second label and the one or more server sound models.

96. The apparatus of claim 95, wherein the means for receiving is configured to receive, from the server, at least one of location information or time information associated with each of the one or more server sound models, and wherein the means for updating is configured to update the means for storing based on the at least one of the location information or the time information associated with the one or more server sound models.

97. The apparatus of claim 95, further comprising:
means for outputting the second label and receiving an input indicating whether the second label matches the input environmental sound,
wherein the means for updating is configured to update the means for storing based on the input.

98. The apparatus of claim 88, further comprising means for receiving a second label identifying the input environmental sound from a server, wherein the means for receiving is configured to receive location information associated with the input sound model, and wherein the means for storing is configured to store information corresponding to at least one of a location or a time associated with each of the plurality of sound models.

99. The apparatus of claim 98, wherein the means for determining is configured to filter the plurality of sound models based on the location information to identify the one or more sound models.

100. The apparatus of claim 98, wherein the means for storing is configured to store prior occurrence information associated with each of the plurality of sound models, and wherein the one or more sound models are identified based on the prior occurrence information.

101. The apparatus of claim 88, wherein the means for storing, the means for capturing, the means for generating, the means for determining, the means for selecting, and the means for associating are integrated into a mobile communication device.

102. The apparatus of claim 88, wherein the means for storing, the means for capturing, the means for generating, the means for determining, the means for selecting, and the means for associating are integrated into a base station.

103. A computer system for recognizing an input environmental sound, the computer system comprising:
means for storing a plurality of sound models representing environmental sounds and a plurality of labels, wherein each of the plurality of labels identifies at least one of the plurality of sound models;
means for receiving an input sound model representing an input environmental sound from a client device if a confidence level determined by the client device and associated with a first label associated with the input environmental sound is less than a first confidence threshold;
means for determining similarity values between the input sound model and the plurality of sound models to identify one or more sound models of the plurality of sound models that are similar to the input sound model;
means for selecting a second label from one or more labels of the plurality of labels associated with the one or more sound models;
means for associating the second label with the input environmental sound based on a confidence level of the second label; and
means for sending the second label or an indication of a failure in recognizing the input environmental sound to the client device based on the confidence level of the second label.

104. The computer system of claim 103, wherein the means for sending is configured to send the second label and the one or more sound models to the client device if the confidence level of the second label is greater than or equal to a second confidence threshold.

105. The computer system of claim 104, wherein the means for sending further provides at least one of location information and time information associated with each of the one or more sound models to the client device.

106. The computer system of claim 104, wherein the means for receiving further receives at least one of location information and time information associated with the input sound model from the client device, and wherein the means for storing further stores information corresponding to at least one of a location and a time associated with each of the plurality of sound models.

107. The computer system of claim 106, wherein the means for determining filters the plurality of sound models based on the at least one of the location information and the time information to identify the one or more sound models.

108. The computer system of claim 106, wherein the means for storing further stores prior occurrence information associated with each of the plurality of sound models, and wherein the one or more sound models are identified based on the prior occurrence information.

109. The computer system of claim 106, further comprising means for updating the means for storing, wherein if the confidence level of the second label is less than the second confidence threshold:
the means for sending further provides the client device with an indication of a failure in recognizing the input environmental sound;
the means for determining identifies a set of the one or more sound models with information corresponding to at least one of a first location and a first time that match the at least one of the location information and the time information and identifies a first sound model having a greatest similarity to the input sound model from the set; and
the means for updating merges the input sound model and the first sound model if the similarity between the input sound model and the first sound model is greater than or equal to a similarity threshold.

110. The computer system of claim 109, wherein the means for updating stores the input sound model in the means for storing if the similarity between the input sound model and the first sound model is less than the similarity threshold.

111. The computer system of claim 103, wherein the second label is associated with a largest number of sound models among the one or more sound models.

112. The computer system of claim 111, wherein another label is associated with a second largest number of sound models among the one or more sound models, and wherein the confidence level of the second label is determined based on a difference between a sum of the similarity values of the one or more sound models associated with the largest number and a sum of the similarity values of the one or more sound models associated with the second largest number.

113. The computer system of claim 103, wherein the means for selecting groups the one or more sound models into one or more sets of sound models based on the one or more labels, calculates a sum of the similarity values of sound models in each of the one or more sets to determine a largest sum, and selects a particular label associated with a set of the one or more sets having the largest sum.

114. The computer system of claim 113, wherein a second largest sum is identified among the sums of the similarity values, and wherein the confidence level of the second label is determined based on a difference between the largest sum and the second largest sum.

115. The computer system of claim 103, wherein the confidence level of the second label is determined based on a sum of the similarity values of the one or more sound models associated with the second label.

116. The computer system of claim 103, wherein a first sound model having a greatest similarity value to the input sound model is identified among the one or more sound models associated with the second label, and wherein the confidence level of the second label is determined based on a similarity between the first sound model and an associated anti-model.

117. The computer system of claim 104, wherein the means for receiving further receives an input from a user of the client device indicating whether the second label matches the input environmental sound, and further comprising means for updating the server database based on the input from the user.

* * * * *